United States Patent
Guirguis et al.

(10) Patent No.: US 9,619,491 B2
(45) Date of Patent: Apr. 11, 2017

(54) STREAMLINED SYSTEM TO RESTORE AN ANALYTIC MODEL STATE FOR TRAINING AND SCORING

(71) Applicant: SAS Institute Inc., Cary, NC (US)

(72) Inventors: Georges H. Guirguis, Cary, NC (US);
Dominique J. Latour, Cary, NC (US);
Robert S. Ray, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/972,652

(22) Filed: Dec. 17, 2015

(65) Prior Publication Data
US 2016/0292162 A1    Oct. 6, 2016

Related U.S. Application Data

(60) Provisional application No. 62/142,056, filed on Apr. 2, 2015.

(51) Int. Cl.
*G06F 17/30* (2006.01)
(52) U.S. Cl.
CPC .............................. *G06F 17/30294* (2013.01)
(58) Field of Classification Search
None
See application file for complete search history.

(56) References Cited

U.S. PATENT DOCUMENTS

| | | | | |
|---|---|---|---|---|
| 6,317,752 B1 * | 11/2001 | Lee | .................. | G06F 17/30595 707/748 |
| 9,043,344 B1 * | 5/2015 | Chen | ................. | G06F 17/30569 707/756 |
| 9,306,965 B1 * | 4/2016 | Grossman | ........... | H04L 63/1416 |
| 9,338,065 B2 * | 5/2016 | Vasseur | ............... | H04L 41/5009 |
| 2004/0025171 A1 * | 2/2004 | Barinov | ............ | G06F 17/30286 719/318 |
| 2005/0114405 A1 * | 5/2005 | Lo | ...................... | G06F 17/30914 |
| 2010/0145902 A1 * | 6/2010 | Boyan | ................. | G06F 17/3089 706/54 |
| 2014/0046969 A1 * | 2/2014 | Ejsing | ................. | G06F 17/3051 707/769 |
| 2014/0207871 A1 * | 7/2014 | Miloushev | ............ | G06F 9/5016 709/205 |

(Continued)

OTHER PUBLICATIONS

SAS Institute Inc. 2015. SAS® 9.4 DS2 Language Reference, Fourth Edition. Cary, NC: SAS Institute Inc., Feb. 2015, pp. 1-1270.

(Continued)

*Primary Examiner* — Sherief Badawi
*Assistant Examiner* — Christopher J Raab
(74) *Attorney, Agent, or Firm* — Bell & Manning, LLC

(57) ABSTRACT

A computing device restores a state of an analytic model. A first indicator of a dataset is received. A second indicator is received of an analytic model state file in which a state of an analytic model is stored. A reentry point name of a function to restore the analytic model is extracted from the state stored in the analytic model state file indicated by the received second indicator. The function is called using the extracted reentry point name to restore the state of the analytic model. The dataset indicated by the received first indicator is scored using the restored state of the analytic model. Scoring results from the scored dataset are written to an output file.

39 Claims, 6 Drawing Sheets

(56) References Cited

U.S. PATENT DOCUMENTS

| | | | |
|---|---|---|---|
| 2014/0229491 A1* | 8/2014 | Bhattacharjee ... | G06F 17/30569 707/748 |
| 2015/0199424 A1* | 7/2015 | Damodaran ...... | G06F 17/30734 707/756 |
| 2015/0347454 A1* | 12/2015 | Krishna ............ | G06F 17/30221 707/757 |
| 2016/0292591 A1 | 10/2016 | Guirguis et al. | |

OTHER PUBLICATIONS

SAS Institute Inc 2013. Getting Started with SAS® Enterprise Miner™ 13.1. Cary, NC: SAS Institute Inc., Dec. 2013.
What is PMML?, http://www.ibm.com/developerworks/library/ba-ind-PMML1/, Jul. 30, 2010.
SAS Institute Inc. 2015. SAS® 9.4 In-Database Products: User's Guide, Fifth Edition. Cary, NC: SAS Institute Inc., Feb. 2015, pp. 1-328.
Predictive Model Markup Language, http://en.wikipedia.org/wiki/Predictive_Model_Markup_Language, Printed on Jun. 4, 2015.
SAS Institute Inc. 2014. Base SAS® 9.4 Procedures Guide: High-Performance Procedures, Third Edition. Cary, NC: SAS Institute Inc., Aug. 2014.
Guazzelli et al., PMML: An Open Standard for Sharing Models, Contributed Research Articles, The R Journal vol. 1/1, May 2009, pp. 60-65.
SAS Institute Inc. 2012. SAS® High-Performance Analytics Server 12.1: User's Guide. Cary, NC: SAS Institute Inc., Aug. 2012.
The Neural Procedure, Copyright 2000 by SAS Institute Inc., Cary, NC, USA. All rights reserved.

\* cited by examiner

US 9,619,491 B2

STREAMLINED SYSTEM TO RESTORE AN ANALYTIC MODEL STATE FOR TRAINING AND SCORING

CROSS-REFERENCE TO RELATED APPLICATIONS

The present application claims the benefit of 35 U.S.C. §119(e) to U.S. Provisional Patent Application No. 62/142,056, filed on Apr. 2, 2015, the entire contents of which is hereby incorporated by reference.

BACKGROUND

Computational processes are widely-used to analyze, understand, integrate, and transform data. For example, a data mining process may be used to create highly-accurate, predictive, and descriptive models based on analysis of large amounts of data captured in a variety of industries to solve technical problems such as electrical and/or mechanical control system optimization, weather prediction, etc. Analytical tools train a statistical or machine learning model using the data to reliably predict an outcome, describe an optimum value for a control, determine an expected result, etc. After training, the trained model predicts or describes an outcome from new data. However, using the trained model with the identical data input to train the model may generate a different result, for example, as a result of differences in precision between the trained model executing in memory and the trained model executing after being stored in a file.

SUMMARY

In an example embodiment, a system is provided. The system includes, but is not limited to, a processor and a computer-readable medium operably coupled to the processor. The computer-readable medium has instructions stored thereon that, when executed by the processor, cause the system to restore a state of an analytic model. A first indicator of a dataset is received. A second indicator is received of an analytic model state file in which a state of an analytic model is stored. A reentry point name of a function to restore the analytic model is extracted from the state stored in the analytic model state file indicated by the received second indicator. The function is called using the extracted reentry point name to restore the state of the analytic model. The dataset indicated by the received first indicator is scored using the restored state of the analytic model. Scoring results from the scored dataset are written to an output file.

In another example embodiment, a non-transitory computer-readable medium is provided having stored thereon computer-readable instructions that when executed by a computing device, cause the computing device to restore a state of an analytic model.

In yet another example embodiment, a method of restoring a state of an analytic model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
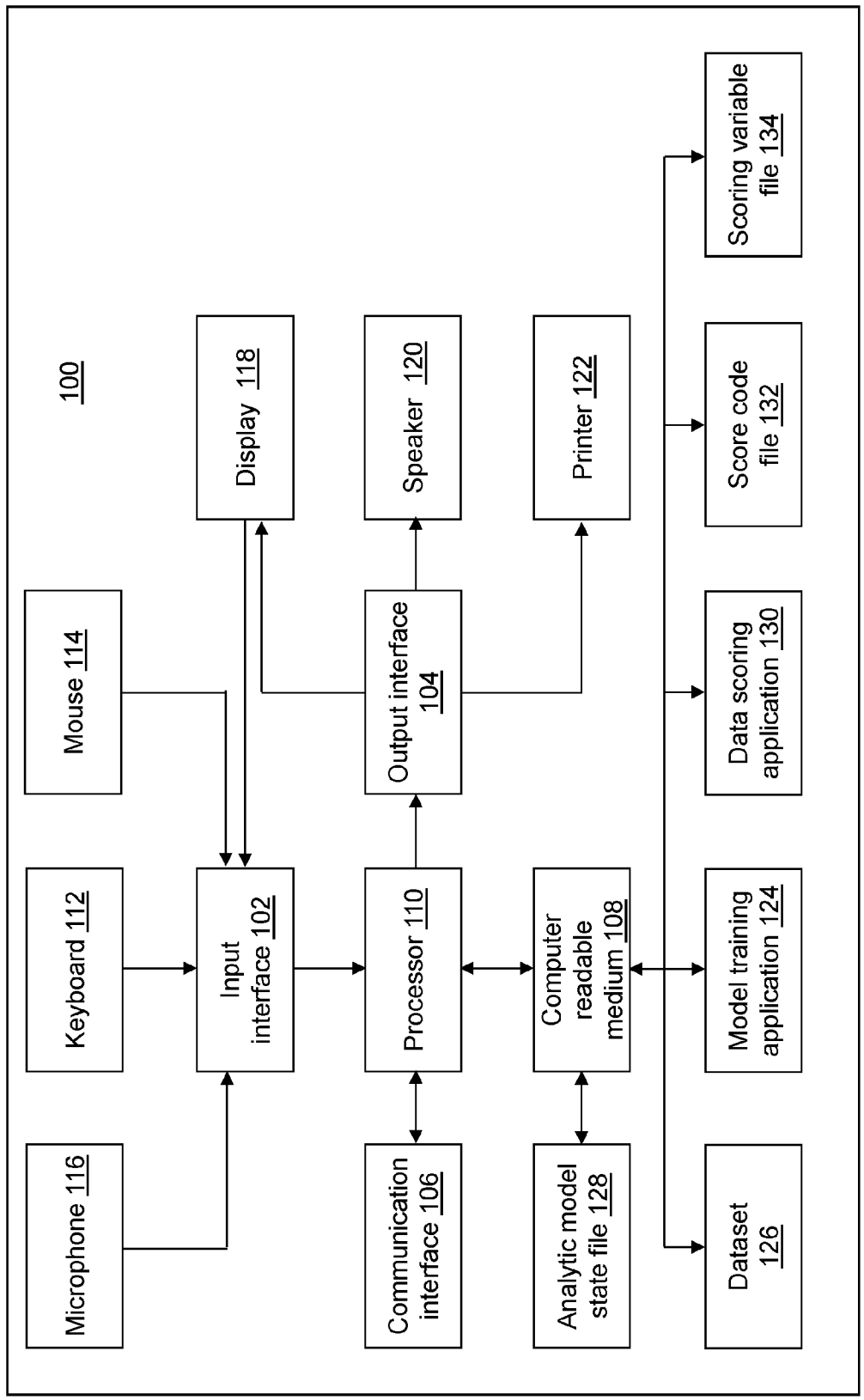
FIG. 1 depicts a block diagram of a model training & scoring device in accordance with an illustrative embodiment.

Referring to FIG. 1, a block diagram of a model training & scoring device 100 is shown in accordance with an illustrative embodiment. Model training & scoring device 100 seamlessly performs a data mining process to train a predictive and/or a descriptive model(s) based on analysis of a large amount of data; after training, stores the state of the trained model(s); and, after storage of the state of the model(s), scores new data (or the original data for verification) by restoring the state of the model(s) from the stored state. Training the model computes values for weights associated with a model definition. Scoring the new data applies new data to the trained model to compute results such as a predicted outcome, an optimized value of a parameter, etc. In an illustrative embodiment, the stored state is transportable to a different computing device for scoring the new data or different data.

An analytic engine is a collection of components and services that collectively train an analytic model. For example, an analytic engine is a collection of libraries that perform a certain analytical task such as a linear regression engine, a logistic regression engine, a neural network engine, a decision tree engine, a support vector machine engine, etc. During training, an intermediate state of a model is applied to each record of the data and to define an improved state of the model by adjusting model parameters. Training stops when an acceptable state of the model is reached typically based on one or more input criteria. A record can be scored using the intermediate state or a final state of the analytic engine that was defined as part of the training process.

Model training & scoring device 100 may include an input interface 102, an output interface 104, a communication interface 106, a computer-readable medium 108, a processor 110, a model training application 124, a dataset 126, an analytic model state file 128, a data scoring application 130, a score code file 132, and a scoring variable file 134. Fewer, different, and/or additional components may be incorporated into model training & scoring device 100. As discussed further below, one or more of model training application 124, dataset 126, analytic model state file 128, and data scoring application 130 may be stored on a plurality of computing devices with communication between model training application 124, dataset 126, analytic model state file 128, and data scoring application 130 through communication interface 106. Model training application 124 and data scoring application 130 may be integrated into a single application, may be separately executed applications, or may be part of an integrated, distributed application supporting some or all of the same or additional types of functionality as described herein.

Input interface 102 provides an interface for receiving information from the user for entry into model training & scoring device 100 as understood by those skilled in the art. Input interface 102 may interface with various input technologies including, but not limited to, a keyboard 112, a mouse 114, a microphone 116, a display 118, a track ball, a keypad, one or more buttons, etc. to allow the user to enter information into model training & scoring device 100 or to make selections presented in a user interface displayed on display 118. The same interface may support both input interface 102 and output interface 104. For example, display 118 comprising a touch screen provides user input and presents output to the user. Model training & scoring device 100 may have one or more input interfaces that use the same or a different input interface technology. The input interface technology further may be accessible by model training & scoring device 100 through communication interface 106.

Output interface 104 provides an interface for outputting information for review by a user of model training & scoring device 100 and/or for use by another device. For example, output interface 104 may interface with various output technologies including, but not limited to, display 118, a speaker 120, a printer 122, etc. Model training & scoring device 100 may have one or more output interfaces that use the same or a different output interface technology. The output interface technology further may be accessible by model training & scoring device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training & scoring device 100 may have one or more communication interfaces that use the same or a different communication interface technology. For example, model training & scoring device 100 may support communication using an Ethernet port, a Bluetooth antenna, a telephone jack, a USB port, etc. Data and messages may be transferred between model training & scoring device 100 and other devices using communication interface 106.

Computer-readable medium 108 is an electronic holding place or storage for information, such as an optical media storage, a magnetic media storage, a semiconductor media storage, a magneto-optical media storage, etc. so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model training & scoring device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training & scoring device 100 also may have one or more drives that support the loading of a memory media such as a CD, DVD, an external hard drive, etc. One or more external hard drives further may be connected to model training & scoring device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training & scoring device 100 may include a plurality of processors that use the same or a different processing technology.

Model training application 124 performs operations associated with training an analytic model using data stored in dataset 126. Some or all of the operations described herein may be embodied in model training application 124. The operations may be implemented using hardware, firmware, software, or any combination of these methods. Referring to the example embodiment of FIG. 1, model training application 124 is implemented in software (comprised of computer-readable and/or computer-executable instructions) stored in computer-readable medium 108 and accessible by processor 110 for execution of the instructions that embody the operations of model training application 124. Model training application 124 may be written using one or more programming languages, assembly languages, scripting languages, etc.

Model training application 124 may be implemented as a Web application. For example, model training application 124 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 126 includes a plurality of rows and a plurality of columns. The rows of dataset 126 may be referred to as observations and the columns associated with an observation may be referred to as attributes of the observation for the associated variables. In an alternative embodiment, dataset 126 may be transposed. Dataset 126 may be stored as a plurality of records in the form $(x, Y)=(x_1, x_2, \ldots, x_k, Y)$, where variable, Y, is a target variable for which a model is being created. The vector x is composed of input variables, $x_1, x_2, \ldots, x_k$, that are used to model a determination of Y. The target variable Y can be any of the plurality of columns. Model training application 124 may use one or more of the input variables, $x_1, x_2, \ldots, x_k$, to generate the analytic model for dataset 126.

The data stored in dataset 126 may be generated by and/or captured from a variety of sources including one or more sensors of the same or different type, one or more computing devices, etc. The data stored in dataset 126 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, comma separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools. Example SAS software tools include Base SAS, SAS® Enterprise Miner™, SAS/STAT®, SAS® High Performance Analytics Server, SAS® LASR™, SAS® Embedded Process, the SAS® Scoring Accelerator software tool, SAS® In-Database Products, SAS®/CONNECT, SAS® Scalable Performance Data Engine, SAS® Metadata, SAS® DS2 Language, SAS® Visual Analytics, all of which are developed and provided by SAS Institute Inc. of Cary, N.C., USA. The content of the data may include textual information, graphical information, image information, audio information, numeric information, etc. that further may be encoded using various encoding techniques as understood by a person of skill in the art.

For illustration, model training application 124 may be implemented using one or more SAS software tools such as Base SAS, SAS® Enterprise Miner™, SAS/STAT®, SAS® High Performance Analytics Server, SAS® LASR™, SAS® Embedded Process, the SAS® Scoring Accelerator software tool, SAS® In-Database Products, SAS®/CONNECT, SAS® Scalable Performance Data Engine, SAS® Metadata, SAS® DS2 Language, SAS® Visual Analytics, all of which are developed and provided by SAS Institute Inc. of Cary, N.C., USA. Illustrative analytic models, which may be trained using model training application 124 and all or a portion of data stored in dataset 126, include a forward stepwise least squares regression model, an additive nonlinear model, a stochastic gradient boosting model, a least angle regressions model, a memory-based reasoning model, a neural network model, a partial least squares model, a linear regression model, a logistic regression model, a rule induction model, a support vector machine (SVM) model, a random forest model, a two-stage model, an ensemble model, etc. Each of forward stepwise least squares regression model, additive nonlinear model, stochastic gradient boosting model, least angle regressions model, memory-based reasoning model, neural network model, partial least squares model, linear regression model, logistic regression model, rule induction model, SVM model, random forest model, two-stage model, and ensemble model are illustrative types of analytic models.

The forward stepwise least squares regression model, linear regression model, and logistic regression model are regression-type models. The additive nonlinear model may use bucketed principal components as inputs to predict a binary or an interval target variable.

The stochastic gradient boosting model may create a series of simple decision trees that together form a single predictive model. Each tree in the series of simple decision trees may be fit to a residual of a prediction from the earlier trees in the series. Each time the data is used to grow a tree, an accuracy of the tree is computed. The successive samples are adjusted to accommodate previously computed inaccuracies. Boosting may be defined for binary, nominal, and interval targets.

The least angle regressions model can perform both variable selection and model-fitting tasks. When used for variable selection, the least angle regressions model may select variables in a continuous fashion, where coefficients for each selected variable grow from zero to the variable's least square estimates.

The memory-based reasoning model can be used to identify similar cases and to apply information that is obtained from these cases to a new record. The memory-based reasoning model may use a k-nearest neighbor algorithm to categorize or predict observations.

The neural network model may be a multilayer, feed-forward neural network, for example.

The partial least squares model models continuous and binary targets extracting factors called components or latent vectors that can be used to explain response variation or predictor variation in dataset 126.

The rule induction model may use split techniques to remove a largest pure split node from dataset 126. The rule induction model may also create binary models for each level of a target variable and rank the levels from a most rare event to a most common event.

The SVM model is a supervised machine learning method used to perform classification and regression analysis. A standard SVM problem solves binary classification problems that produce non-probability output (only sign +1/−1) by constructing a set of hyperplanes that maximize a margin between two classes.

The random forest model may construct a plurality of decision trees and output a class that is a mode of the classes (classification) or a mean prediction (regression) of individual decision trees. The random forest model can be used to rank an importance of variables in a regression or classification problem in a natural way.

The two-stage model may build a sequential or concurrent two-stage model for predicting a class variable and an interval target variable at the same time. The interval target variable is usually a value that is associated with a level of the class target.

Model training application 124 further may construct an analytic model that is an ensemble model by combining posterior probabilities (for class targets) or predicted values (for interval targets) from multiple predecessor models. For example, a common ensemble approach uses multiple modeling methods, such as a neural network and a decision tree, to obtain separate models from the same dataset 126. The component models from the two complementary modeling methods are integrated to form a final analytic model.

Analytic model state file 128 includes data needed to restore the state of the model(s) trained by model training application 124 as discussed further below. Analytic model state file 128 may store the state for a plurality of analytic models. For example, analytic model state file 128 may be a database file, and the information to restore the state for an analytic model may be stored in a row of the database file. Additional analytic model states may be stored in additional rows of the database file.

Score code file 132 may include a scoring code program. Scoring variable file 134 may include scoring variables and other properties that are used and created by the scoring code program. For illustration, the score code file 132 may include a scoring code program written using the SAS DS2 Language, and scoring variable file 134 may be an XML file.

In an illustrative embodiment, analytic model state file 128 includes state information items stored using a binary format based on a unique set of tags defined based on the type of analytic model. A tag marks a unique set of bytes. For example, a plurality of state information items may be associated with each tag, and a plurality of tags is associated with each type of analytic model. The unique set of bytes stores the plurality of state information items. The set of bytes further may be stored as a continuous block of bytes in binary.

For illustration, Table I below includes a list of tags that may be defined for all of the analytic model types. The list of tags in Table I may be referred to as public tags because they are defined for all analytic models. Each unique tag may be interpreted differently based on the type of analytic model trained using model training application 124.

TABLE I

| Tag descriptor | State information item descriptors | State information item data types |
|---|---|---|
| Run Info | Date. | double |
| " | Time. | double |
| " | Analytic model type name and name length. | character, 32 bit integer |
| " | Analytic model reentry point name and name length. This is the component (e.g., shared library) that can read and process the analytic model. | character, 32 bit integer |
| " | Grid host name and name length. | character, 32 bit integer |
| XML format | For illustration: proc format; value engsize low-<3 = 'toys' 3-<6 = 'granny' 6-high = 'usable'; run; The internal values are converted to a string (anything <3 is called toys, anything between 3 and 6 is called granny. This information can be stored as an xml file. | |
| Parameter list | Parameter list for dataset 126. | |
| Class summary | For illustration: If a variable "z" has data values {1, 5, 6} during training, the information about the variable z is saved by this tag. | |
| Cont summary | For illustration: a continuous or interval variable is a numeric value. For a numeric value, a minimum, maximum, mean, standard deviation, and other statistics are saved by this tag. | |
| Effects | For illustration: main effects are composed of single variables, and interaction-effects are a Cartesian product of two or more variables. For example, let z in {1, 5, 6} and b in {0, 1}. The Cartesian product of the interaction is {(1 ,0), (5, 0), (6, 0), (1 , 1), (5, 1), (6, 1)}. Not all these pairs have to be present in the data. The data set may contain only three pairs out of the six possible pairs. The number of interactions and their state is saved by this tag. | |

TABLE I-continued

| Tag descriptor | State information item descriptors | State information item data types |
|---|---|---|
| Input variable list | Input variable list for dataset 126. | |
| Output variable list | Output variable list for scoring should be named properly. For example, if z is {1, 3, 4} then the predictors may be named P_z1, P_z3, P_z4 and the classifier may be named I_z. Names, labels, roles, and variable types as they come out of the training engine are saved by this tag. | |
| Misc parameter list | Miscellaneous parameter list for dataset 126 | |
| Where string | For illustration, this optional tag identifies a portion of the data to score. A "where" clause or any filter may be defined. | |

The analytic model type name may be read and used to identify which, if any, additional tags are read to restore the state for that analytic model type. Additional tags associated with less than all of the analytic model types may be referred to as private tags for the associated analytic model type. For illustration, Table II below includes a list of private tags defined for the random forest type of analytic model.

TABLE II

| Tag descriptor | State information item descriptors | State information item data types |
|---|---|---|
| Forest Basic Info | Number of scoring variables | 32 bit integer |
| Forest Basic Info | Number of input variables | 32 bit integer |
| Forest Basic Info | Number of model variables | 32 bit integer |
| Forest Basic Info | Number of target variables | 32 bit integer |
| Forest Basic Info | Number of trees | 32 bit integer |
| Forest Target Variables | Target variable types | Number of target variables 32 bit integers |
| Forest Target Variables | Target variable names | Number of target variables character strings |
| Forest Target Variables | Target variable name lengths | Number of target variables 32 bit integers |
| Score Variables | List of ordered score variables | Number of input variables 32 bit integers |
| Score Variables | Score variable id list | Number of input variables 32 bit integers |
| Output Variables | Specific variable lengths and roles of the variables that result from scoring, e.g. P_Species1, I_Species | |
| Tree Info | A graph of the tree, which includes nodes on the graph (graph in a mathematical sense) and edges, which are links between the nodes. For each node, information on each split, a split variable, a condition of the split and predictors in that case are included. | Number of trees blobs of doubles |
| Target Into List | If the target is a class variable, levels of the target are stored as byte strings. Specifics of each level are included. | |

A tag directory may include a unique tag for a state item, a state item offset value at which the state item is stored in analytic model state file 128, and a state item length value that defines a length in bytes of the state item for each state item. The tag directory may also be stored in analytic model state file 128. For example, the tag directory is stored at an end of the analytic model state file 128 after each of the state information items. A location offset that indicates a start of the tag directory may be added to a header of analytic model state file 128. For illustration, the tag directory may include a number of tags followed by sequences of item tag, item length, and item location. The state information items may be selected based on a type of model of the analytic model trained using model training application 124. For illustration, each unique tag may be identified by and stored as an 8-byte unsigned integer.

Data scoring application 130 performs operations associated with scoring data stored in dataset 126. Scoring may use the same or different data from dataset 126 as that used by model training application 124 to train the analytic model. For example, data scoring application 130 may use another dataset stored on model training & scoring device 100 or another dataset accessible by model training & scoring device 100, for example, using input interface 102 or communication interface 106. Some or all of the operations described herein may be embodied in data scoring application 130. The operations may be implemented using hardware, firmware, software, or any combination of these methods. Referring to the example embodiment of FIG. 1, data scoring application 130 is implemented in software (comprised of computer-readable and/or computer-executable instructions) stored in computer-readable medium 108 and accessible by processor 110 for execution of the instructions that embody the operations of data scoring application 130. Data scoring application 130 may be written using one or more programming languages, assembly languages, scripting languages, etc. Data scoring application 130 may be implemented as a Web application.

If dataset 126 and/or the analytic model are distributed across one or more other devices, a distributed processing system can be used. For example, referring to FIG. 4, a block diagram of a distributed processing system 400 is shown in accordance with an illustrative embodiment. In an illustrative embodiment, distributed processing system 400 may include a model training system 402, a scoring system 404, distributed systems 406, a distributed control device 408, and a network 410. Distributed processing system 400 may be parallelized and managed using various combinations of hardware and software systems. For example, any of Base SAS, SAS® Enterprise Miner™, SAS/STAT®, SAS® In-Memory Analytics, SAS® High Performance Analytics Server, SAS® LASR™, SAS® Embedded Process, SAS® Scoring Accelerator, SAS® In-Database Products, SAS®/CONNECT, SAS® DS2 Language, etc. may be used to support distributed processing system 400.

For illustration, distributed control device 408 and distributed systems 406 may store and coordinate access to data in dataset 126 implemented as a multi-node Hadoop® cluster. As another illustration, distributed control device 408 and distributed systems 406 may store and coordinate access to data in dataset 126 implemented as a cube of data. Distributed control device 408 may coordinate and control access by model training system 402 and scoring system 404 to the data stored by the distributed systems 406. One or more components of distributed processing system 400 may support multithreading as understood by a person of skill in the art.

The components of distributed processing system 400 may be located in a single room or adjacent rooms, in a single facility, and/or may be distributed geographically from one another. Each of distributed systems 406, model training system 402, scoring system 404, and distributed control device 408 may be composed of one or more discrete devices.

Network 410 may include one or more networks of the same or different types. Network 410 can be any type of wired and/or wireless public or private network including a cellular network, a local area network, a wide area network such as the Internet, etc. Network 410 further may comprise sub-networks and consist of any number of devices.

Model training system 402 can include any number and type of computing devices that may be organized into subnets. Model training & scoring device 100 is an example computing device of model training system 402. The computing devices of model training system 402 send and receive communications through network 410 to/from another of the one or more computing devices of model training system 402, to/from scoring system 404, to/from distributed systems 406, and/or to/from distributed control device 408. The one or more computing devices of model training system 402 may include computers of various form factors such as an integrated messaging device 412, a desktop 414, a laptop 416, a personal digital assistant, a tablet computer, a server computer, etc. The one or more computing devices of model training system 402 may communicate using various transmission media that may be wired and/or wireless as understood by those skilled in the art. A model training device of model training system 402 may include model training application 124 and may store analytic model state file 128 locally (as shown in FIG. 1) or remotely, for example, on one or more of distributed systems 406 and/or distributed control device 408.

Scoring system 404 can include any number and type of computing devices that may be organized into subnets. Model training & scoring device 100 is an example computing device of scoring system 404. The computing devices of scoring system 404 send and receive communications through network 410 to/from another of the one or more computing devices of scoring system 404, to/from distributed systems 406, and/or to/from distributed control device 408. The one or more computing devices of scoring system 404 may include computers of any form factor such as an integrated messaging device 426, a desktop 428, a laptop 430, a personal digital assistant, a tablet computer, a server, etc. The one or more computing devices of scoring system 404 may communicate using various transmission media that may be wired and/or wireless as understood by those skilled in the art. A scoring device of scoring system 404 may include data scoring application 130. Analytic model state file 128 may be stored locally (as shown in FIG. 1) or remotely, for example, on one or more of distributed systems 406 and/or distributed control device 408.

Figure 4:
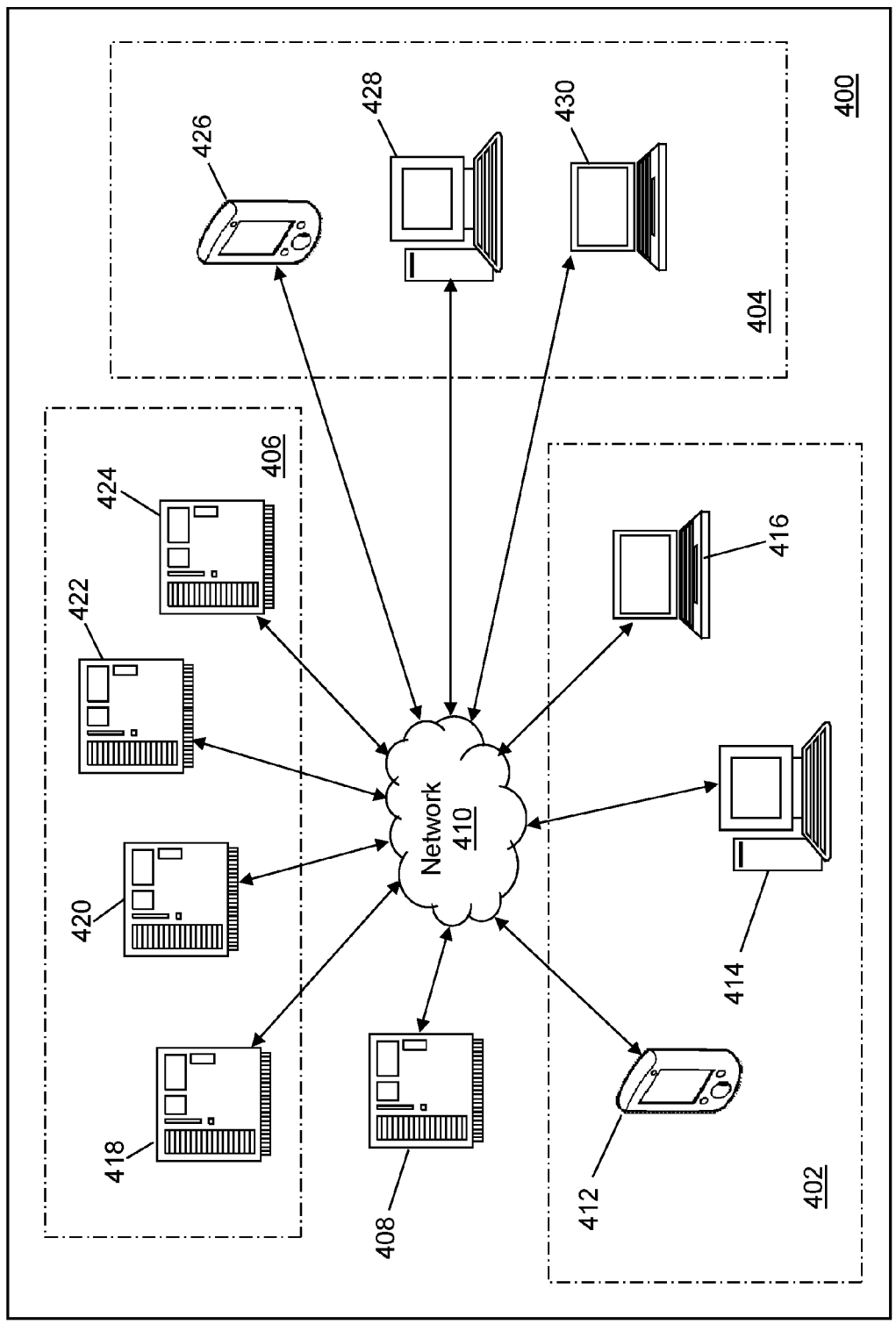
FIG. 4 depicts a block diagram of a distributed processing system in accordance with an illustrative embodiment.

For illustration, FIG. 4 represents distributed systems 406 with a first server computer 418, a second server computer 420, a third server computer 422, and a fourth server computer 424. Distributed systems 406 can include any number and form factor of computing devices that may be organized into subnets. The computing devices of distributed systems 406 send and receive communications through network 410 to/from another of the one or more computing devices of distributed systems 406, to/from distributed control device 408, to/from model training system 402, and/or to/from scoring system 404. The one or more computing devices of distributed systems 406 may communicate using various transmission media that may be wired and/or wireless as understood by those skilled in the art.

In the illustrative embodiment, distributed control device 408 is represented as a server computing device though distributed control device 408 may include one or more computing devices of any form factor that may be organized into subnets. Distributed control device 408 sends and receives communications through network 410 to/from distributed systems 406, to/from model training system 402, and/or to/from scoring system 404. Distributed control device 408 may communicate using various transmission media that may be wired and/or wireless as understood by those skilled in the art.

Distributed processing system 400 may use cloud computing technologies, which support on-demand network access to a shared pool of configurable computing resources (e.g., networks, servers, storage, applications and services) that can be rapidly provisioned and released with minimal management effort or service provider interaction. Distributed processing system 400 may use the SAS® LASR™ Analytic Server to deliver statistical modeling and machine learning capabilities in a highly interactive programming environment, which may enable multiple users to concurrently manage data, transform variables, perform exploratory analysis, and build and compare models. Distributed processing system 400 may use SAS In-Memory Statistics for Hadoop® to read big data once and analyze it several times by persisting it in-memory. Some systems may be of other types and configurations. Distributed processing system 400 may implement another type of SAS server solution, another hosted data solution offered by another vendor such as the SAP Hana Cloud Platform offered by SAP SE headquartered in Walldorf, Germany, Oracle® Database In-Memory offered by Oracle Corporation of Redwood Shores, Calif., USA, etc.

For illustration, a procedure "hpds2" submits DS2 language statements from a Base SAS session to one or more machines in a grid for parallel execution. The procedure "hpds2" verifies the syntactic correctness of the DS2 source on the client machine such as model training & scoring device 100 before submitting it for execution by distributed systems 406. The output data created by the DS2 "data" statement can be written in parallel back to dataset 126 stored across distributed systems 406 or can be returned to dataset 126 stored at model training & scoring device 100. Because the DS2 code is executed in parallel on separate grid nodes that have different data partitions of dataset 126, each node produces separate output that is a result of processing only the local data partition. A second-stage program may be used to aggregate the results from each node as needed. The second stage can be executed on model training & scoring device 100 and/or on distributed control device 408.

Figure 2:
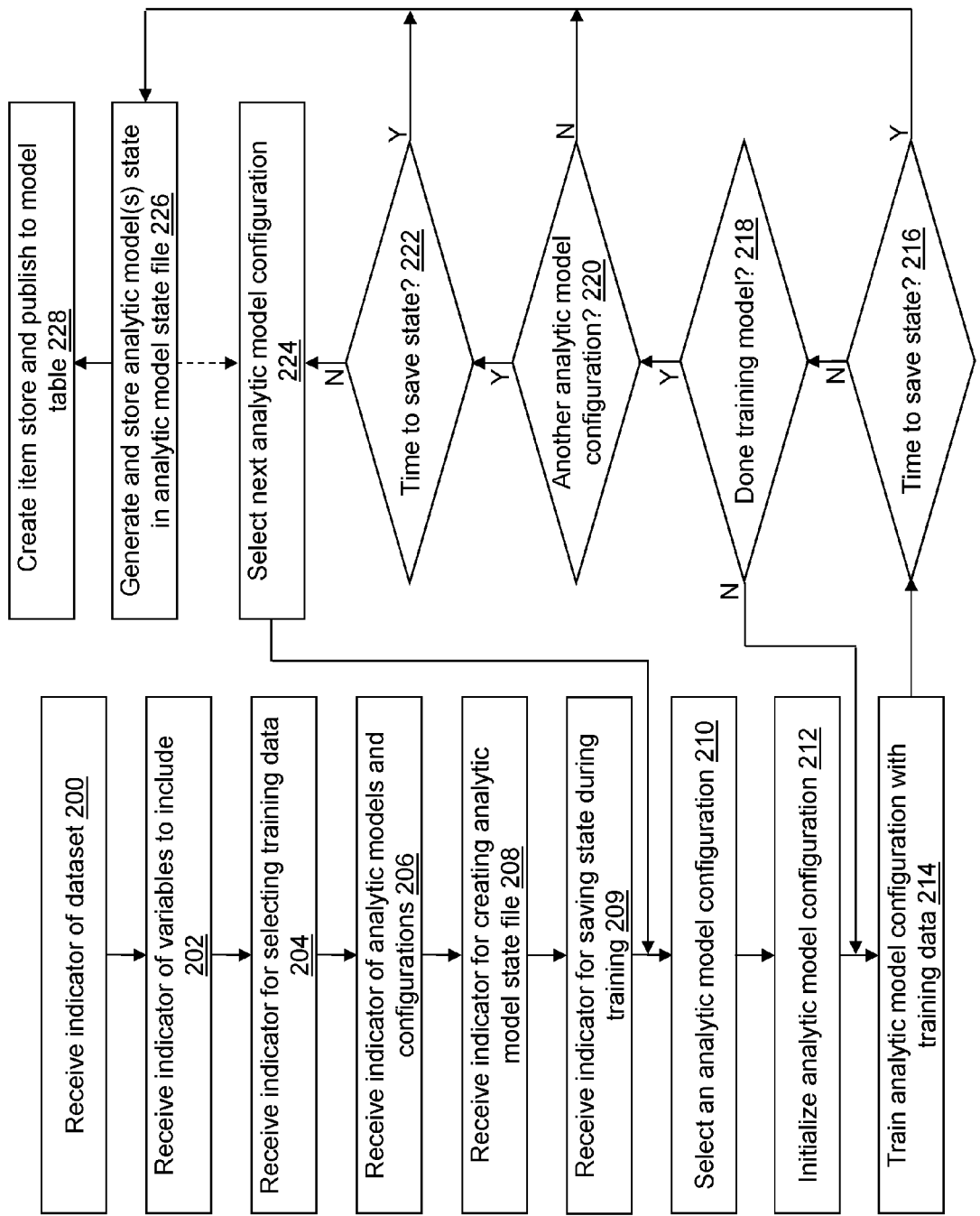
FIG. 2 depicts a flow diagram illustrating examples of operations performed by a model training application of the model training & scoring device of FIG. 1 in accordance with an illustrative embodiment.

Referring to FIG. 2, example operations associated with model training application 124 are described. Model training application 124 may be used to train one or more analytic models using all or a portion of the data stored in dataset 126 and to store the state for the trained one or more analytic models. The state may be captured and stored when training is complete or at any intermediate training step so that training can be restarted at the intermediate training step. Additional, fewer, or different operations may be performed depending on the embodiment. The order of presentation of the operations of FIG. 2 is not intended to be limiting. Although some of the operational flows are presented in sequence, the various operations may be performed in various repetitions, concurrently (in parallel, for example, using threads or multiple computing devices), and/or in other orders than those that are illustrated. For example, a user may execute model training application 124, which causes presentation of a first user interface window, which may include a plurality of menus and selectors such as drop down menus, buttons, text boxes, hyperlinks, etc. associated with model training application 124 as understood by a person of skill in the art. An indicator may indicate one or more user selections from a user interface, one or more data entries into a data field or a data window of the user interface, one or more data items read from computer-readable medium 108 or otherwise defined with one or more default values, etc. that are received as an input by model training application 124.

In an operation 200, a first indicator of dataset 126 is received. For example, the first indicator indicates a location of dataset 126. As an example, the first indicator may be received by model training application 124 after selection from a user interface window or after entry by a user into a user interface window. In an alternative embodiment, dataset 126 may not be selectable. For example, a most recently created dataset may be used automatically or a default dataset name may be used.

Dataset 126 may be stored in a cube distributed across a grid of computers, may be stored in a multi-node Hadoop® cluster distributed across one or more computers, may be stored in a file system distributed across one or more computers, in a relational database, in one or more tables, in a structured query language database, may be stored in a cloud computing system, may be loaded into an in-memory server such as the SAS® LASR™ Analytic Server, etc.

In an operation 202, a second indicator of variables to include when training the analytic model is received. The variables may be all or a subset of the variables included in dataset 126. In an alternative embodiment, the second indicator may not be received. For example, some analytic models may determine the parameters to include such that this operation is not performed. As another example, all or a subset of the variables may be used automatically.

In an operation 204, a third indicator for selecting training data from dataset 126 is received. The third indicator may be received by model training application 124, for example, after selection from a user interface window or after entry by a user into a user interface window. The third indicator identifies a first portion of the data stored in dataset 126 or indicates that all of the data stored in dataset 126 to use in training the analytic model. The third indicator may indicate a number of data points to include, a percentage of data points of the entire dataset 126 to include, etc. A subset may be created from dataset 126 by sampling. An example sampling algorithm is uniform sampling. Other random sampling algorithms may be used and may be selectable by a user or may be used by default.

In an operation 206, a fourth indicator of one or more types of analytic models and configurations is received. For example, the fourth indicator indicates a name of a type of analytic model. For illustration, the name may be "forward stepwise least squares regression", "additive nonlinear", "stochastic gradient boosting", "least angle regressions", "memory-based reasoning", "neural network", "partial least squares", "linear regression", "logistic regression", "rule induction", "SVM", "random forest", "two-stage", "ensemble", etc. A configuration identifies one or more initialization values based on the type of analytic model. For example, when the type of analytic model is indicated as "neural network", a number of hidden layers, a number of nodes per layer, a propagation method, etc. further may be identified by the fourth indicator. A plurality of configurations may be defined. For example, when the type of analytic model is neural network, a range of numbers of hidden layers, a range of numbers of nodes per layer, etc. also may be identified by the fourth indicator.

The fourth indicator may be received by model training application 124 after selection from a user interface window or after entry by a user into a user interface window. A default value for the types of analytic models and configurations may further be stored, for example, in computer-readable medium 108.

In an operation 208, a fifth indicator indicating that analytic model state file 128 is to be created is received. For example, the fifth indicator includes a name and a location of analytic model state file 128. The fifth indicator may include a keyword that defines the name and the location as that of analytic model state file 128. If analytic model state file 128 exists, the new state may be appended as a new row. In an alternative embodiment, if analytic model state file 128 exists, the new state may overwrite the existing data stored analytic model state file 128. If analytic model state file 128 does not exist, a new file may be opened. The fifth indicator may be received by model training application 124 after selection from a user interface window or after entry by a user into a user interface window. In an alternative embodiment, the name and the location of analytic model state file 128 may not be selectable. For example, a default name and location may be used automatically.

In an operation 209, a sixth indicator indicating that a state be saved to analytic model state file 128 before each analytic model and analytic model configuration has been trained. For example, the sixth indicator indicates a clock time at which the analytic model state is saved, an execution time at which the analytic model state is saved, an analytic model configuration after which the analytic model state is saved, etc. The sixth indicator may be received by model training application 124 after selection from a user interface window or after entry by a user into a user interface window. In an alternative embodiment, the state may not be savable to analytic model state file 128 before each analytic model and analytic model configuration has been trained.

In an operation 210, an analytic model is selected based on the fourth indicator or based on a default model stored in computer-readable medium 108. For example, if the fourth indicator indicates a plurality of types of analytic models and configurations, a first analytic model and configuration may be selected from the plurality as the selected analytic model. When a plurality of types of analytic models and configurations are specified, a best analytic model may be selected from the plurality of types of analytic models and configurations or an ensemble model may be trained.

In an operation 212, the selected analytic model is initialized. In an operation 214, the initialized analytic model is trained using the training data as indicated by the second indicator and the third indicator. For example, SAS® Enterprise Miner™, SAS/STAT®, SAS® High Performance Analytics Server, SAS® LASR™, or SAS® Embedded Process may be used to train the initialized analytic model.

In an operation 216, a determination is made concerning whether or not it is time to save the state as indicated by the sixth indicator. When it is time to save the state, processing continues in an operation 226. When it is not time to save the state, processing continues in an operation 218.

In an operation 218, a determination is made concerning whether or not the training of the initialized analytic model is done. When the training of the initialized analytic model is done, processing continues in an operation 220. When the training of the initialized analytic model is not done, processing continues in operation 214 to continue the training.

In operation 220, a determination is made concerning whether or not there is another analytic model to train. When there is another analytic model to train, processing continues in an operation 222. When there is not another analytic model to train, processing continues in operation 226.

In an operation 222, a determination is made concerning whether or not it is time to save the state as indicated by the sixth indicator. When it is time to save the state, processing continues in operation 226. When it is not time to save the state, processing continues in an operation 224.

In operation 224, a next analytic model is selected based on the fourth indicator and processing continues in operation 210.

In operation 226, a state of the analytic model(s) is generated and saved (stored in) to analytic model state file 128. When a plurality of types of analytic models and configurations are specified, a best analytic model may be selected from the plurality of types of analytic models and configurations before saving the state to analytic model state file 128. For example, a validity score computed and stored for each trained analytic model may be compared and the analytic model associated with the best validity score may be saved. The best validity score may be a minimum or a maximum value of the validity scores computed. For example, if the validity score is a misclassification rate, a minimum validity score indicates the best analytic model; whereas, if the validity score is a correct classification rate, a maximum validity score indicates the best analytic model. As another option, when a plurality of types of analytic models and configurations are specified, a state of the ensemble model may be saved to analytic model state file 128. As yet another option, when a plurality of types of analytic models and configurations are specified, a state of each of the plurality of types of analytic models and configurations may be stored in analytic model state file 128 such that processing may continue in operation 224 to select a next analytic model for training after storing a current model state as indicated by the dashed line.

The state may include a name of a module or shared library to be loaded for scoring, an entry point in that module (e.g., name of the specific function) that can receive the various elements of a final or an intermediate state of the analytic model, and descriptors of the model variables, variable summaries, regression coefficients, user defined formats, language information, locale information, normalization information as needed based on the type of the analytic model.

For illustration, the following code may train an SVM analytic model type using the SAS® High Performance Analytics Server with a dataset 125 named "iris" and may save the state to analytic model state file 128 named "svm_state_file":

```
proc hpsvm data=iris method=ipoint;
kernel linear;
input SepalLength SepalWidth PetalLength PetalWidth/
    level=interval;
target species/order=desc;
savestate file='svm_state_file';
run;
```

For illustration, the following code may train a random forest analytic model type based on the procedure "HPFOREST" using dataset 126 named "sampsio.dmagecr" and may save the state to analytic model state file 128 named "hpfstate1":

```
data dmagecr;
set sampsio.dmagecr;
run;
```

```
proc HPFOREST data=dmagecr maxtrees=5
maxdepth=5;
    input history job housing savings/level=nominal;
    input checking coapp depends duration employed existcr;
    input installp property/level=interval;
    target age/level=interval;
    score out=score_out1;
    savestate file="hpfstate1";
run;
```

The "input" statements name input variables with options such as "level" that specifies a level of measurement of the associated variable(s). The "target" statement names the target variable whose value is to be predicted with options such as "level" that specifies a level of measurement of the target variable. The "score" statement scores the training data set by using the forest model that was trained by the procedure HPFOREST and outputs a dataset that contains the scored results. The output data set contains ID variables that may be specified in an ID statement, predictions, residuals, and decisions. The prediction variables depend on the measurement type of the target variable in the model. For a target that has an interval measurement level, a single prediction variable is generated. For each level of the target that has a nominal measurement level, a posterior probability variable is generated in addition to the final predicted level.

Figure 5:
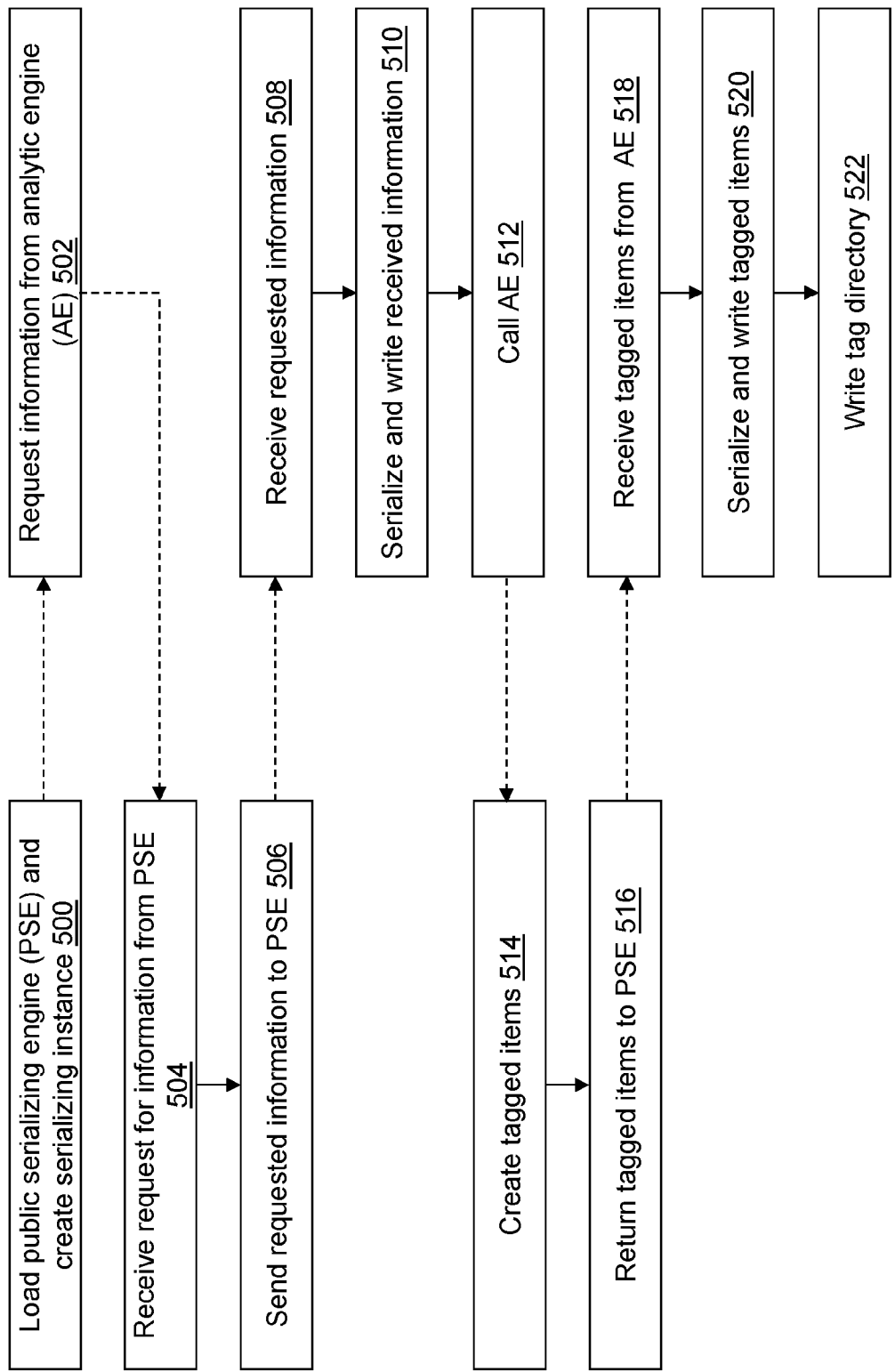
FIG. 5 depicts a flow diagram illustrating additional examples of operations performed by the model training application of the model training & scoring device of FIG. 1 in accordance with an illustrative embodiment.

The "savestate" statement requests the action of saving the state from the analytic engine. For example, the engine "HPFOREST" includes a function "saveThisState" that executes this action. Referring to FIG. 5, additional example operations associated with model training application 124 are described to store the state for the trained one or more analytic models. Additional, fewer, or different operations may be performed depending on the embodiment. The order of presentation of the operations of FIG. 5 is not intended to be limiting.

In an operation 500, the analytic engine (AE) loads a public serializing engine (PSE) and creates a serializing instance from the loaded PSE.

In an operation 502, the serialized instance requests information from the AE. The requested information includes the parameters associated with the public tags such as byte identifiers for the AE specific tags, the name of the AE, the name of one or more point of reentry into the AE when reloading the item store, the name of additional information like the name of the client for the purpose of describing the run, the time stamp of the original run, the host name where the AE performed the training, the language and encoding information, formatting information for an xml stream, the input list of variables, the output list of variables, the summary and statistics of each input variable: (e.g. mean, minimum, maximum, standard deviation, levels and the frequency of each level for possible imputing, etc), the target profile and output variables specifics, etc. For illustration, the name of the client for the purpose of describing the run is a procedure name and is the visible part of the AE as far as the user is concerned.

An illustrative input list of variables may include a "Species" variable that is a character variable, a "SepalLength" variable that is a numeric variable, a "SepalWidth" variable that is a numeric variable, a "PetalLength" variable that is a numeric variable, and a "PetalWidth" variable that is a numeric variable. An illustrative output list of variables may include a "_P_" variable that is a numeric variable, a "P_Species2" that is a numeric variable, a "P_Species1" variable that is a numeric variable, a "I_Species" variable that is a 32 character variable, and a "_WARN_" variable that is a 4 character variable.

The byte identifiers include, for example in SAS 24 bytes for transportability, byte sequences of different type of elementary data types such as various types of integers, floats, doubles, wide characters, narrow characters, etc. The byte identifiers render the state transportable where transportable means that the state can be created on model training & scoring device 100 and used to score data on a second computing device that is configured differently. For example, the byte identifiers include transportability information related to restoring doubles, various types of integers, and characters from a byte stream is also stored in the byte stream. For example, the transportability information may be stored at the beginning of the byte identifiers stream and may include a number of descriptors identifying big endian or little endian, whether or not there is a byte swap for integers, how to reconstruct a double from its saved bytes, etc. The byte identifiers may include two descriptors: the store descriptors and the scoring host descriptors.

In an operation 504, the AE receives the information request from the serialized instance. In an operation 506, the AE sends the requested information to the serialized instance. For example, the AE sends the PSE the information needed for the serialization through a function call back such as "engineGetValue".

In an operation 508, the serialized instance receives the requested information from the AE. In an operation 510, the serialized instance serializes and writes the received information to analytic model state file 128. The PSE creates tagged items that include the parameters associated with the public tags defined in Table I.

In an operation 512, the serialized instance calls the AE. In an operation 514, the AE creates tagged items that include the parameters associated with the private tags defined for the type of AE. The AE created tagged items may include a problem description, the multiple options needed to recreate the engine (e.g. svm, kernel type, variable transformation, etc.), regression parameters, active constraints, if any, additional information for classification of the target, etc. In an operation 516, the AE returns the created tagged items to the PSE.

In an operation 518, the PSE receives the tagged items from the AE. In an operation 520, the PSE serializes and writes the tagged items to analytic model state file 128. In an illustrative embodiment, the AE and the PSE may repeat operations 512-520 for each tagged item based on the type of AE.

In an operation 522, the PSE writes the tag directory to an end of analytic model state file 128 updates the file header to write the location offset of the tag directory.

For illustration, the code included in the Computer program listing appendix (Appendix) at the end of the Detailed Description may save the state for the random forest analytic model type defined by the procedure HPFOREST.

In the code included in the Appendix, a "soscore" object (PSE) begins to write the public tag information that includes run information, input model information, expected output variable names from the application of the model, the engine information, and the point of reentry back into the engine. The "soscore" object yields to the AE "HPForest" to write its own additional attributes whose contents are invisible to the "soscore" object. The "soscore" object sees only a byte stream because, though the "soscore" object knows about the state items written by the engine, the "soscore" object does not know how to interpret them.

In the code included in the Appendix, each call of the function "soscoreWriteItem" writes a binary byte stream associated with a specific tag to analytic model state file 128. As an example, the function "writeForestBasicInfo" above is associated with tag "tkforest_tag_basic_info", denoted "Forest Basic Info" in Table II above, that appends five 32 bit integers to the binary byte stream that is storing the state of the random forest analytic model type. The five 32 bit integers are serialized by storing each state information item in an array before appending to the binary byte stream.

As another example, the function "writeForestTargetVariables" included in the Appendix is associated with tag "tkforest_tag_target_vars", denoted "Forest Target Variables" in Table II above. The function "writeForestTargetVariables" allocates a block of memory using "GET_TK_MEM" and stores a variable type, a variable name, and a variable name length of each target variable in the allocated block of memory. The functions "soscorePackInt32" and "soscorePackTKChar" serialize the target variable values of each target variable before calling the function "soscoreWriteItem".

Successive calls to the function "soscoreWriteItem" by other "Write" functions (e.g., "writeTheTargetIntoList", "writeForestTreeInfo", etc.) append the additional state item, "item→data", to the binary byte stream. The function "soscoreWriteItem" also updates the tag directory with the associated tag, "item→tag", the state item offset value at which the state item is appended to the byte stream, and the state item length value, "item→length". The tag directory may be appended to analytic model state file 128 after each state item has been written. As stated previously, the tag directory stored in analytic model state file 128 is used to locate each state item within the byte stream that stores the state in analytic model state file 128.

In an operation 228, an item store may be created from the state and published to a model table. For example, the following macro creates an item store named "model1" stored in a model table "SAS_MODEL_TABLE_1" in a directory "C:\myprojects\saphana\test" that includes a state (e.g. as described in the sample code above for the random forest analytic model type) stored as "score.store" in a directory "C:\myprojects\saphana\models\model1". The code stored in score code file 132 "score.ds2" is also stored in the model table.

%  indhn_publish_model(
action=create,
dir=C:\myprojects\saphana\models\model1,
datastep=score.ds2,
xml=fooData.xml,
store=score.store,
modelname=model1,
modeltable=SAS_MODEL_TABLE_1,
outdir=C:\myprojects\saphana\test);

The model table may include a plurality of states that are each stored in a different row of the model table. Each row of the model table may include the model name ("modelname"), the state (analytic model state file 128 named "score.store"), the score code (score code file 132 named "score.ds2"), a model format (scoring variable file 134 named "fooData.xml"), etc. with each stored in a different column of a row. One or more computing devices of scoring system 404 may read a row of the model table to score using the stored state, score code, model format, etc.

A procedure "storeit" may combine one or more input files into the item store. Based on the example above, an aggregate item store created on disk as "c:\temp\model1.is" is stored to the state column of the model table for the model named "model1". Three metadata blobs are included in the item store. The state is read from file "u:\dev\hana\test\score.store" as a first blob. The score code is read from file "u:\dev\hana\test\score.ds2" as a second blob. The model format is read from file "fooData.xml" in the current working directory as a third blob.

filename epstore 'c:\temp\model1.is';
filename in1 'C:\myprojects\saphana\models\model1\score.store';
filename in2 'C:\myprojects\saphana\models\model1\score.ds2;
proc storeit out=epstore;
input in1 type=analytic_store name=store1;
input in2 type=ds2 name=DS2Code;
input "fooData.xml" type=formats name=fooData;
run;

The indicator "type=analytic_store" identifies "score.store" as a saved state. The indicator "type=ds2" identifies "score.ds2" as saved score code. The indicator "type=other" identifies "fooData.xml" as a saved model format (scoring variable file 134).

The information stored in each of "score.store", "score.ds2", and "fooData.xml" is stored in a separate column. Each may be stored in association with a different blob data type such as "TKEPSTORE_BLOB_TYPE_TKSTORE", "TKEPSTORE_BLOB_TYPE_TKDS2", "TKEPSTORE_BLOB_TYPE_FORMAT", and "TKEPSTORE_BLOB_TYPE_OTHER", respectively. A hash key and the name ("name=") further may stored in association with the blob stored in each column. Each row of the model table defines a model that can be used in a data mining process.

For illustration, the SAS Model Manager uses the SAS Scoring Accelerator and SAS/ACCESS interface to a database to publish models to the database. The Scoring Accelerator takes the models from SAS Model Manager and translates them into scoring files or functions that can be deployed inside the database. After the scoring functions are published using the SAS/ACCESS interface to the database, the functions extend the database's SQL language and can be used in SQL statements such as other database functions. After the scoring files are published, they are used by the SAS Embedded Process to run the scoring model. The item store stored in a row of the model table may be used for in-database SAS Embedded Process processing.

The procedure "storeit" may support various statements. The "input" statement illustrated above has the syntax "input file <TYPE=type> <NAME=name>;" and includes the specified file in the item store. Illustrative values for type may include analytic_store, ds2, formats, grid_parameters, and other. The "NAME" specifies the name of the item in the item store.

An extension indicated by "out=epstore" creates an item store suitable for use by the in-database Embedded Process ("epstore") by storage in the model table. A length value may be associated with each value described above that is also included in the item store. For example, the item store has the following structure: 1) a number of blobs, 2) the blob type for each blob of the number of blobs indicated by the integer values associated with "TKEPSTORE_BLOB_TYPE_TKSTORE", "TKEPSTORE_BLOB_TYPE_TKDS2", and "TKEPSTORE_BLOB_TYPE_OTHER", 3) a length of a hash key for each blob of the number of blobs, 3) the hash key for each blob of the number of blobs, 5) a length of the name for each blob of the number of blobs, 6)

the name for each blob of the number of blobs, 7) a length of each blob of the number of blobs, and 8) each blob of the number of blobs.

Figure 3:
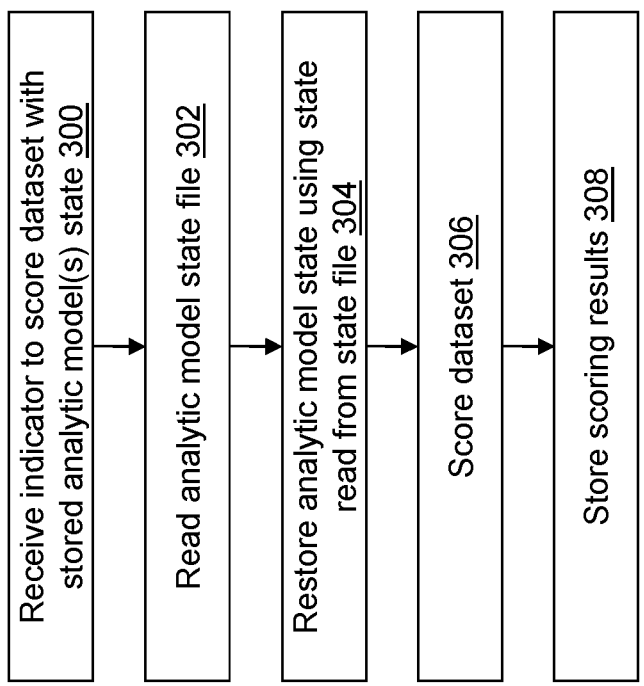
FIG. 3 depicts a flow diagram illustrating examples of operations performed by a data scoring application of the model training & scoring device of FIG. 1 in accordance with an illustrative embodiment.

Referring to FIG. 3, example operations associated with data scoring application 130 are described. Data scoring application 130 may be used to score one or more analytic models using the state saved to analytic model state file 128. Additional, fewer, or different operations may be performed depending on the embodiment. The order of presentation of the operations of FIG. 3 is not intended to be limiting. Although some of the operational flows are presented in sequence, the various operations may be performed in various repetitions, concurrently (in parallel, for example, using threads or multiple computing devices), and/or in other orders than those that are illustrated. For example, a user may execute data scoring application 130, which causes presentation of a first user interface window, which may include a plurality of menus and selectors such as drop down menus, buttons, text boxes, hyperlinks, etc. associated with data scoring application 130 as understood by a person of skill in the art. An indicator may indicate one or more user selections from a user interface, one or more data entries into a data field or a data window of the user interface, one or more data items read from computer-readable medium 108 or otherwise defined with one or more default values, etc. that are received as an input by data scoring application 130.

In an operation 300, a first indicator to score a dataset with a stored analytic model(s) is received. For example, the first indicator indicates a location of dataset 126 or another dataset. As an example, the first indicator may be received by data scoring application 130 after selection from a user interface window or after entry by a user into a user interface window. In an alternative embodiment, dataset 126 may not be selectable. For example, a most recently created dataset may be used automatically. The first indicator may further indicate analytic model state file 128 and/or a state stored in analytic model state file 128. In an illustrative embodiment, each state may be uniquely defined by a key string and the first indicator includes the key string or a plurality of key strings.

In an operation 302, the analytic model state is read from analytic model state file 128. The tag directory is read, and a byte stream is read from analytic model state file 128. The tag directory is read to identify the matching unique tag and the state item offset value and the state item length value associated with the identified matching unique tag in the byte stream that includes the tagged items. The byte identifiers are read from the tagged items and used to convert the variables to the scoring host native data types. For illustration, SAS 24 bytes may be used to describe each host. There is no need for conversion when the store descriptors match the scoring host descriptors.

The tree of state items is reconstructed back when a state item is requested from analytic model state file 128 or the model table using the unique tag. The data associated with the state item is read from analytic model state file 128 or the blob stored in the model table using the state item offset value to locate the starting bit and the state item length value to define the number of bytes read from the located starting bit. The state information items are parsed from the read data associated with the state item.

In an operation 304, the state of the analytic model is restored to define an analytic engine using the analytic model state read from analytic model state file 128 and the analytic model is placed into a score ready mode. The type of analytic model is read from the state of the analytic model and used to instantiate the analytic engine. The instantiated analytic engine further restores its parameters and its state from the state of the analytic model and prepares itself for scoring one record at a time. In a distributed system, the state of the analytic model may be made available to a plurality of work units through an object mediator that is responsible for transporting the state from analytic model state file 128 to each work unit that may be distributed to multiple computing devices.

Figure 6:
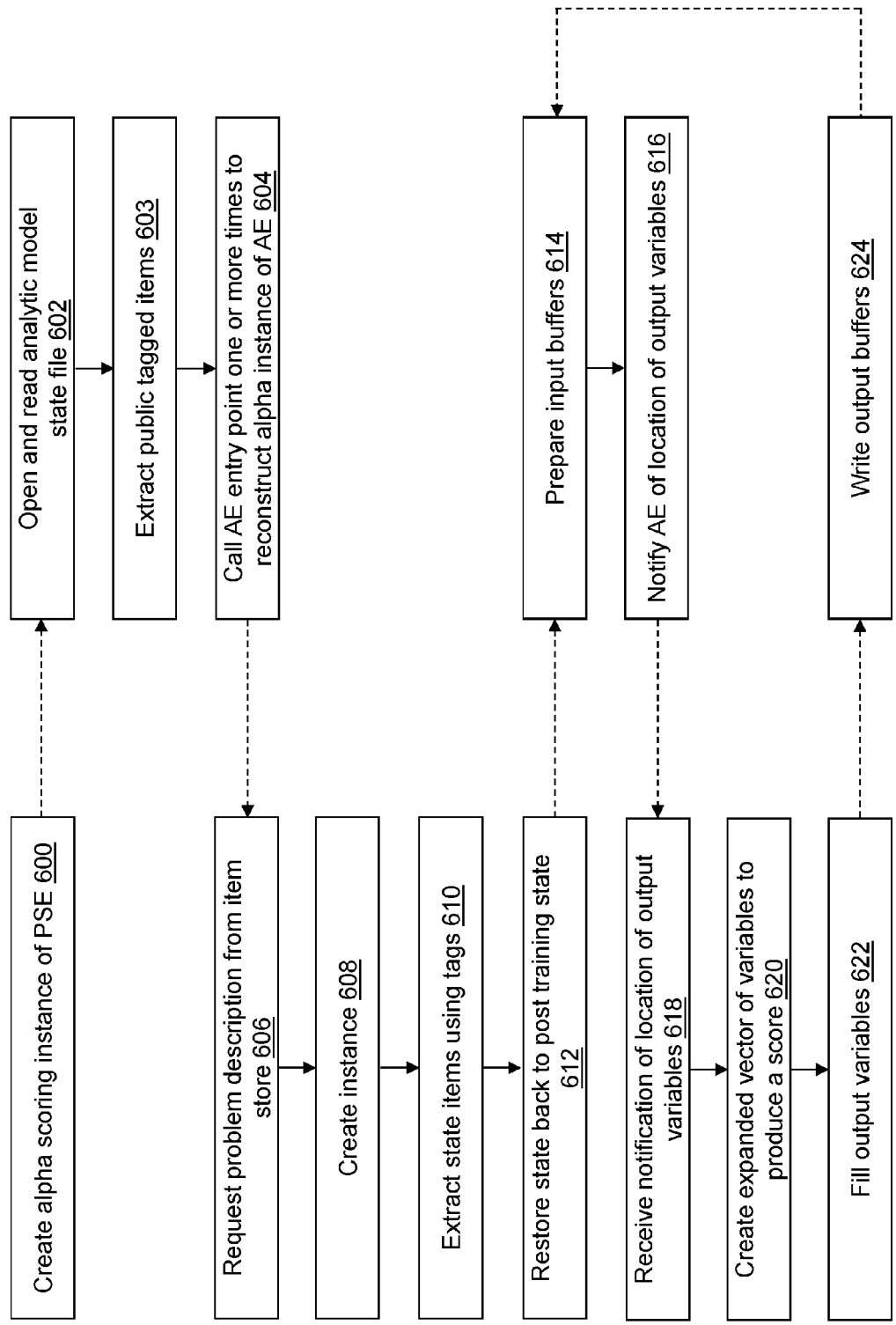
FIG. 6 depicts a flow diagram illustrating additional examples of operations performed by the data scoring application of the model training & scoring device of FIG. 1 in accordance with an illustrative embodiment.

Referring to FIG. 6, additional example operations associated with data scoring application 130 are described to store the state for the trained one or more analytic models. Additional, fewer, or different operations may be performed depending on the embodiment. The order of presentation of the operations of FIG. 6 is not intended to be limiting.

In an operation 600, a data mediator opens the item store and creates an alpha scoring instance of the PSE. A "DATA_MANAGER" general abstract class may be used as an interface that implements the specifics of a data feeder of dataset 126. The DATA_MANAGER structure can be filled with data attributes and callbacks from the AE as well as the data feeder. For illustration, two scoring clients have been implemented. In a first scoring client, a high performance scoring interface was implemented, and the data buffer is owned by the environment. In a second scoring client, a scoring interface was implemented using DS2, which owns the data buffer.

An illustrative DATA_MANAGER structure may have the following form:

```
typedef struct DATA_MANAGER dataManager_S, *dataManagerPtr;
struct DATA_MANAGER {
    tkVarListPtr    inList;
    tkVarListPtr    outList;
    int64_t         inRecordLen;
    int64_t         outRecordLen;
    char            *inRecordPtr;
    char            *outRecordPtr;
};
```

A data mediator is an object between a data owner and the DATA_MANAGER general abstract class. The DATA_MANAGER contains the input record length, the input record pointer, the output record pointer, the input variables and their offsets, and the output variables and their offsets. The input buffer and the output buffer can be separate (e.g., high performance scoring interface) or the same buffer as in the DS2 implementation.

In an operation 602, the alpha scoring instance opens and reads the tag directory and the serialized byte stream from analytic model state file 128. In an operation 603, the PSE extracts the tagged items that include the parameters associated with the public tags defined in Table I.

In an operation 604, the AE entry point extracted from the public tags is called one or more times to reconstruct an alpha instance of the AE. Different reentry points may be defined for scoring, for retraining, etc.

In an operation 606, the AE requests a problem description item from the item store. In an operation 608, the AE creates an instance. In an operation 610, the AE extracts and reloads the private tagged items stored in the byte stream. For illustration, each write in the example included in the Appendix to save the state for the random forest analytic model type has a corresponding read.

As an illustrative example, the code below writes the problem description item for the SVM analytic model type:

```
static TKStatus writeDesc(tksvmStatePtr svmStatePtr)
{
    soscoreInstancePtr  soscore = svmStatePtr->soscore;
    tksvmInstancePtr    tksvm = svmStatePtr->tksvm;
    TKStatus            status = TK_OK;
    if (tksvm == NULL) {
        status = TKSTATE_ERROR_FAILED_ENGINE;
        goto fail;
    } else {
        tksvmPrivatePtr   tksvmpvt = (tksvmPrivatePtr)
            tksvm->instPrivate;
        itemDescriptor_S  item[1] = { 0 };
        item->tag = tksvm_tag_desc;
        item->length = sizeof(tksvmpvt->mdesc);
        item->data = &tksvmpvt->mdesc;
        status = soscoreWriteItem(soscore, item);
    }
fail:
    return status;
}
```

The code below is the corresponding read of the problem description item for the SVM analytic model type:

```
static TKStatus readDesc(tksvmStatePtr svmStatePtr)
{
    tksvmInstancePtr    tksvm = svmStatePtr->tksvm;
    TKStatus            status = TK_OK;
    if (tksvm == NULL) {
        status = TKSTATE_ERROR_FAILED_ENGINE;
        goto fail;
    } else {
        soscoreInstancePtr  soscore = svmStatePtr->soscore;
        tksvmPrivatePtr     pPtr = tksvmGetPrivatePtr(tksvm);
        itemDescriptor_S    item[1] = { 0 };
        item->tag = tksvm_tag_desc;
        status = soscoreReadItem(soscore, item);
        if (status == TK_OK) {
            char     *data = item->data;
            soscoreUnpack_Data(soscore, &pPtr->mdesc,
                sizeof(pPtr->mdesc),
                TKSVM_DESC_map, data);
        }
    }
fail:
    return status;
}
```

As another illustrative example, the code below writes an estimates item for the SVM analytic model type:

```
static TKStatus writeEstimates(tksvmStatePtr svmStatePtr)
{
    soscoreInstancePtr  soscore = svmStatePtr->soscore;
    tksvmInstancePtr    tksvm = svmStatePtr->tksvm;
    tksvmPrivatePtr     tksvmpvt = tksvmGetPrivatePtr(tksvm);
    tkesvoInstancePtr   svoInst = tksvmpvt->tkesvoInst;
    int32_t    kernelType = svoInst->opt->kertype;
    int64_t    nrowY = svoInst->nrowY;
    int64_t    ncolY = svoInst->ncolY;
    int64_t    nftr = svoInst->opt->nftr;
    int64_t    nw = svoInst->trueSizew;
    int64_t    nwmax = svoInst->opt->nwmax;
    char       *data;
    itemDescriptor_S  item[1] = { 0 };
    item->tag = tksvm_tag_parameterEstimates;
    item->length = sizeof(int32_t) + 5 * sizeof(int64_t) + 3 *
        sizeof(double);
    if (nw < nwmax)
        item->length += nw * sizeof(double);
    else{
        item->length += nrowY * (nftr + 2) * sizeof(double);
    }
```

```
    GET_TKMEM(tksvmpvt->pool, item->data, item->length, char,
    return
        TK_NOMEM);
    data = item->data;
    soscorePackInt32(kernelType, data);
    soscorePackInt64(nrowY, data);
    soscorePackInt64(ncolY, data);
    soscorePackInt64(nftr, data);
    soscorePackInt64(nw, data);
    soscorePackInt64(nwmax, data);
    soscorePackDouble(svoInst->resStr->beta, data);
    soscorePackDouble(svoInst->resStr->fmax, data);
    soscorePackDouble(svoInst->resStr->fmin, data);
    if (nw < nwmax) {
        /* store nw w's */
        double      *w = svoInst->resStr->w;
        soscorePackManyDoubles(w, nw, data);
    } else {
        double      *v = svoInst->vduals;
        double      *d = svoInst->dlabels;
        double      *y = svoInst->Y;
        /* save nRow v's, nRow d's , nrowY * nftr Y's */
        soscorePackManyDoubles(v, nrowY, data);
        soscorePackManyDoubles(d, nrowY, data);
        soscorePackManyDoubles(y, nrowY * nftr, data);
    }
    return soscoreWriteItem(soscore, item);
}
```

The code below is the corresponding read of the estimates item for the SVM analytic model type:

```
static TKStatus readEstimates(tksvmStatePtr svmStatePtr)
{
    soscoreInstancePtr  soscore = svmStatePtr->soscore;
    tksvmInstancePtr    tksvm = svmStatePtr->tksvm;
    tksvmPrivatePtr     tksvmpvt = tksvmGetPrivatePtr(tksvm);
    tkesvoInstancePtr   svoInst = tksvmpvt->tkesvoInst;
    itemDescriptor_S    item[1] = {0};
    int32_t    kertype;
    int64_t    nrowY;
    int64_t    ncolY;
    int64_t    nftr;
    int64_t    nw;
    int64_t    nwmax;
    char       *data;
    TKStatus   status = TK_OK;
    item->tag = tksvm_tag_parameterEstimates;
    status = soscoreReadItem(soscore, item);
    if (status)
        return status;
    data = item->data;
    soscoreUnpackInt32(soscore, kertype, data);
    soscoreUnpackInt64(soscore, nrowY, data);
    soscoreUnpackInt64(soscore, ncolY, data);
    soscoreUnpackInt64(soscore, nftr, data);
    soscoreUnpackInt64(soscore, nw, data);
    soscoreUnpackInt64(soscore, nwmax, data);
    svoInst->nrowY = nrowY;
    svoInst->ncolY = ncolY;
    svoInst->opt->nftr = nftr;
    svoInst->trueSizew = nw;
    svoInst->opt->nwmax = nwmax;
    soscoreUnpackDouble(soscore, svoInst->resStr->beta,
        data);
    soscoreUnpackDouble(soscore, svoInst->resStr->fmax,
        data);
    soscoreUnpackDouble(soscore, svoInst->resStr->fmin,
        data);
    if (svoInst->trueSizew < svoInst->opt->nwmax) {
        /* store nw w's */
        int    nw = svoInst->trueSizew;
        double   *w = NULL;
        GET_TKMEM(svmStatePtr->notMyPool, w, nw,
            double, return
            TK_NOMEM);
        soscoreUnpackManyDoubles(soscore, w, nw, data);
        svoInst->resStr->w = w;
```

-continued

```
    } else {
        long        nrowY = svoInst->nrowY;
        long        nftr = svoInst->opt->nftr;
        int32_t     nDoubles = nrowY * (nftr + 2L);
        double      *temp = NULL;
        #include "tkzm.h"
        GET_TKMEM(svmStatePtr->notMyPool, temp, nDoubles,
        double, return
            TK_NOMEM);
        svoInst->vduals = temp; temp += nrowY;
        svoInst->dlabels = temp; temp += nrowY;
        svoInst->Y = temp;
        /* save nRow v's, nRow d's , nrowY * nftr Y's */
        soscoreUnpackManyDoubles(soscore, svoInst->vduals, nrowY,
        data);
        soscoreUnpackManyDoubles(soscore, svoInst->dlabels, nrowY,
        data);
        soscoreUnpackManyDoubles(soscore, svoInst->Y, nrowY *
        nftr, data);
    }
    return status;
    fail:
    return TKSTATE_ERROR_FAILED_ENGINE;
}
```

In an operation 612, the AE restores the state back to a post-training state. The alpha scoring instance of the PSE and the alpha instance of the AE are ready to score. The alpha instance of the AE is ready to receive records of data to compute the scores. When using threads, multiple clones of the alpha scoring instance of the PSE can be created. Each clone of the alpha scoring instance of the PSE includes a clone of the alpha instance of the AE.

In an operation 614, the data mediator prepares the input buffer(s) possibly yielding to the AE to transform the input variables using the byte identifiers. In an operation 616, the data mediator notifies the AE of the location of the output variables.

In an operation 618, the AE receives the notification of the location of the output variables. In an operation 620, the AE takes the input variables and creates an expanded vector of dummy (for class variables) or standardized variables to produce a score. The AE has an input buffer pointer, receives the input variable list from the PSE, receives the variable offset of each variable from the data mediator, and knows the variable type and length of the input variables.

In an operation 622, the AE fills the output variables from the output variable list using the location of the output variables and based on the output variable list. For illustration, P_ variables are doubles and an I_ variable is a string of a determined length. P_ are the predictors and I_ is the classifier.

In an operation 624, the data mediator writes the output buffer(s) in the case of multiple threads. Operations 614-624 are repeated until there are no more buffers. The data mediator then destroys any clones and the alpha scoring instance of the PSE. Each alpha scoring instance of the PSE destroys its own alpha instance of the AE.

For illustration, the following code reads a saved state from analytic model state file 128 named "hpfstate1" and scores the state using dataset 126 named "sampsio.dmagecr".

```
data dmagecr;
set sampsio.dmagecr;
run;
% let in_data=dmagecr;
% let out_data=score_out2;
% let nthreads=1;
proc scorefromstate;
    describe epcode="ds2code.sas" store="hpfstate1";
    score data=&in_data out=&out_data store="hpfstate1";
run;
```

The procedure "scorefromstate" includes three statements, a "describe" statement, a "score" statement, and a "performance" statement.

The "describe" statement specifies a name of a store file and can also produce multiple styles of scoring code. Two styles can be executed locally while the third is used in a distributed system. The options include store=<store-file-name> where "store-file-name" is the name of analytic model state file 128 that was created by some analytic engine using some or all of the operations of FIG. 2; "code=<code-file-name>" where "code-file-name" is the name of a valid external code file that can run under ds2 without threads; "tcode=<code-file-name>" where "code-file-name" is the name of a valid external code file that can run under ds2 with threads; and "epcode=<code-file-name>" where "code-file-name" is the name of a valid external code file that can run under ds2 in a distributed system.

The results contain tables about the state, the hash key of the state as well as the input and the output variables involved in scoring. Three styles of scoring code are supported by the optional field of <code|tcode|epcode> that produces the DS2 syntax appropriate for each execution mode. The code is sent to the external file specified by code-file-name. Only code specified using the "epcode" option can be consumed back into a "score" statement.

Execution of the "describe" statement opens analytic state model state file 128, "hpfstate1", and reports some basic information about the state. For example, the basic information includes the state items stored by the public tags such as the date and time, a grid host of the run that produced the state, if any, an input variable list, an output variable list, a hash key of the state, the component that produced the state, the engine to be loaded, and the analytic model reentry point name, one of the code styles needed for execution, etc. Execution of the "describe" statement creates one instance of a "soscore" object, an alpha instance. Execution of the "describe" statement may also generate source code file 132, "ds2code.sas". Execution of the describe statement may also result in creation of four tables: 1) a run information table, 2) a store hash key table, 3) an input variable list table, and 4) an output variable list table. For illustration, there may be three styles of ds2 code produced: 1) standard ds2 code, 2) threaded ds2 code and 3) EP code. The created "soscore" object instantiates the engine by calling the analytic model reentry point name. The instantiated engine reads the private state items and provides additional information by the engine (e.g., how long the training took, etc.).

The "score" statement specifies the name of analytic state model state file 128, dataset 126, and an output dataset name. The "score" statement options include "data=dataset", "store=state-file-name", and "out=out-file-name". If dataset 126 is distributed in a database, the "score" statement reads the data alongside the distributed database. The different computing devices of distributed systems 406 independently read the local data rows, score them, and write them back in the same or a new table.

The "performance" statement defines performance parameters for multithreaded and distributed computing, passes variables about the distributed computing environment, and requests detailed results about the performance characteristics.

The following code implements scoring using a state stored in an item store. The code may be produced either by the describe statement or the score object and can be edited by a user.

```
data sasep.out;
    dcl package score sc( );
    dcl double c2;
    dcl double y having format SPEC.;
    dcl double v1;
    dcl double v2;
    dcl double v3;
    dcl double id;
    dcl char(8) c1;
    method init( );
        sc.setKey(n'2C7C5AB4A559559A93541D37A2D18B290CB2FAE1');
    end;
    method run( );
        set sasep.in;
        sc.scoreRecord( );
    end;
enddata;
```

"dcl package score sc(n'state_file_name')" declares a score package "sc", "sc.setKey (n'2C7C5AB4A559559A93541D37A2D18B290CB2FAE1')" and restores a stored analytic model state using a hash key "2C7C5AB4A559559A93541D37A2D18B290CB2FAE1". The "sc.scoreRecord( )" scores the restored analytic model. The "dcl package" statement simultaneously declares a score package variable and constructs an instance "sc" of the package using the package constructor. "SetKey" is the step in which the item store is recalled from memory with the provided key, and the operations of FIG. 6 are performed. If successful, scoring is performed using "scoreRecord".

As another illustration, the code below uses the SAS® DS2 Language to restore two analytic model states and to score both restored analytic models.

```
proc ds2;
    data &out_data(overwrite=yes);
        dcl package score sc1 (n'analytic_store_1');
        dcl package score sc2(n'analytic_store_2');
        /* declare input variables */
        .....
        /* declare output variables */
        dcl double "_P_";
        dcl double "P_Species1";
        dcl double "P_Species2";
        dcl char(32) "I_Species" having;
        dcl char(4) "_WARN_" having;
        varlist allvars [_all_];
        method init( );
            sc1.setvars(allvars);
            sc2.setvars(allvars);
        end;
        method preScore( );
            .....
        end;
        method postScore( );
            .....
        end;
        method run( );
            set &in_data;
            preScore( );
            sc1.scoreRecord( );
            /* saving or processing the results from sc1 */
            ....
            sc2.scoreRecord( );
            /* saving or processing the results from sc2 */
            ...
            postScore( );
        end;
        method term( );
            /* destroy the two score objects */
        end;
    enddata;
    run;
quit;
```

DS2 code includes an initialization phase "init( )" method, a run phase "run( )" method, and a termination phase "term( )" method. The init( ) and term( ) methods are called once by each computing device; whereas, the run( ) method is called for each observation in dataset 126.

Methods of the "score" package that may be executed under init( ) during the initialization phase include
sc.setvars (var-list);
sc.setkey (store-key);
sc.getkey ( );
sc.code (<code-file-name>);
sc.tcode (<code-file-name>);
sc.epcode (<code-file-name>);
for "sc.code", "code-file-name" is the name of a valid external code file that can run under ds2 without threads; for "sc.tcode", "code-file-name" is the name of a valid external code file that can run under ds2 with threads; and for "sc.epcode", "code-file-name" is the name of a valid external code file that can run under ds2 in a distributed system. Only the getkey( ) method returns a value. The value is the hash key of the state.

Methods of the "score" package that may be executed under run( ) during the run phase include sc.scoreRecord ( ). Methods of the "score" package that may be executed under term( ) during the termination phase include sc.deletekey ( ).

One or more instances of the analytic engine may be restored by direct instantiation, by cloning, or by a combination of instantiation and cloning. A direct instantiation occurs when different entities from the state are sent to a module for a full restoration of one instance of the state of the engine. This type of instance is called an alpha instance. It is a primary instance, and in distributed computing, a single alpha instance per node may be sufficient.

Cloning occurs after creation of an alpha instance on a node to create additional work units to take advantage of local threading. The cloned instance is created from the alpha instance. Clones can share read only memory objects with the alpha instance on a node though, each clone may allocate its own work spaces.

In a distributed system, before starting DS2 execution, a worker thread at a computing device of distributed systems 406 may:
iterate through the directory of blob types and hash keys;
if a current blob type is an "analytic store", the worker thread tries to obtain a global "registration" lock;
when the lock is obtained, the worker thread checks to see if the hash key has been registered in a named repository;
if the hash key has not been registered, the worker thread allocates memory for the state ("analytic store") blob, reads the blob from the item store into the allocated memory, allocates a named repository entry, sets a reference count to zero, and registers the hash key in the named repository;

if the hash key has already been registered, the worker thread reads the "entry" structure from the named repository and increments the reference count.

Afterwards, the DS2 code can be executed with the state restored from the read blob. When processing is terminated, each worker thread may obtain a global "registration" lock;
read the "entry" structure from the named repository;
decrements the reference count; and
release the lock.

When the reference count is zero, the last worker thread frees the allocated memory and removes the "entry" structure from the named repository before releasing the lock.

Multiple clients (SAS® DS2 Language, SAS® High Performance Analytics Server, Java, etc.) can access the state of the analytic model to score individual data records or a buffer of records in dataset 126. For each client, the data/object mediator reconciles a type of data holder of dataset 126 the state of the analytic model.

A data object provides the input variables and receives the output variables described by scoring code. The scoring code may include a pre-processing phase for pre-processing of an input record to apply the transformations (imputations, new variables, etc.) on the input record prior to scoring and a post-processing phase for post processing the scored input record.

In an operation 306, dataset 126 or the dataset specified by the first indicator is scored using the restored analytic model. For example, any of Base SAS, SAS® Enterprise Miner™, SAS/STAT®, SAS® High Performance Analytics Server, SAS® LASR™, SAS® Embedded Process, SAS® Scoring Accelerator software tool, SAS® In-Database Products, SAS®/CONNECT, SAS® DS2, etc. may be used to score dataset 126.

In an operation 308, the scoring results are stored, for example, in computer-readable medium 108. The scoring results further may be presented on display 118 or output to printer 122. For example, the scoring results may be presented using SAS® Visual Analytics.

Some aspects may utilize the Internet of Things (IoT), where things (e.g., machines, devices, phones, sensors) can be connected to networks and the data from these things can be collected and processed within the things and/or external to the things, such as a computer server in a cloud computing system. For example, the IoT can include sensors in many different devices, and high value analytics can be applied to identify hidden relationships and drive increased efficiencies. This can apply to both big data analytics and real-time (e.g., event stream processing (ESP)) analytics.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

Computer program listing Appendix: The following code may save the state for the random forest analytic model type defined by the procedure HPFOREST.

```
static TK Status saveThisState(tkforestInstancePtr tkforest, TKMemPtr iparms, TKMemPtr
    idParms)
{
    tkforestPrivatePtr pPtr = GET_PRIVATEPTR(tkforest);
    soscoreInstanceParmsPtr parms = (soscoreInstanceParmsPtr) iparms;
    soscoreLocalParmsPtr dParms = (soscoreLocalParmsPtr) idParms;
    soscoreExtensionPtr soscoreH = NULL;
    soscoreInstancePtr soscore = NULL;
    engine_S engine[1] = {0};
    TKStatus status = TK_OK;
    tkforestState_S statePtr[1] = {0};
    if (parms->reading) return TKSTATE_ERROR_FATAL;
    engine->engineH = NULL;
    engine->instance = (TKMemPtr) tkforest;
    engine->getValue = engineGetValue;
    engine->name = TKTEXT("tkforest");
    engine->nameLen = TK_SLENT(engine->name);
    engine->mvaName = TKTEXT("hpforest");
    engine->mvaNameLen = TK_SLENT(engine->mvaName);
    /* "executeState" is the name of a multipurpose single function in the tkforest   */
    /* image for reentry with the purpose of scoring. The function can 1) recreate or */
    /* clone the AE, 2) describe some basic information, 3) standardize numeric       */
    /* variables, if needed, 4) score a record, 5) destroy the AE and cleanup.        */
        engine->entryPoint = TKTEXT("executeState");
        engine->entryPointLen = TK_SLENT(engine->entryPoint);
    /* "tkExtensionLoad" loads the dynamic link library for the PSE                   */
    soscoreH = statePtr->soscoreH = (soscoreExtensionPtr) tkExtensionLoad(tkGetHandle( ),
        SOSCORE_NAME, SOSCORE_NAME_LEN, NULL);
```

```
         if (soscoreH == NULL)
            goto fail;
/* "soscoreCreateInstance"creates the instance of the PSE        */
         soscore = statePtr->soscore = soscoreCreateInstance(soscoreH, parms);
         if (soscore == NULL) goto fail;
/* In a distributed system, insures only a distributed control device 408 can save the state */
         dParms->engine = (pPtr->role == TKHPS_ROLE_GENERAL || pPtr->role ==
            TKHPS_ROLE_SOLOIST) ? engine : NULL;
         if (pPtr->role == TKHPS_ROLE_GENERAL) {
            tkhpsPerformancePtr perf;
            tkhpsValueGet(pPtr->tkhpsH, TKHPS_TYPE_PERFORMANCE, &pert);
            dParms->gridHostName = perf->gridhost;
            if (dParms->gridHostName) {
               dParms->gridHostNameLen = TK_SLENT(dParms->gridHostName);
            }
         }
         status = soscoreSetLocalParms(soscore, dParms);
         if (status != TK _OK) goto fail;
         statePtr->tkforest = tkforest;
/* role postoffice puts the underlying store in a standby mode   */
         if (pPtr->role == TKHPS_ROLE_GENERAL || pPtr->role == TKHPS_ROLE_SOLOIST) {
            tkModelPtr _model = pPtr->model;
            pPtr->model = pPtr->scoringModel;
/* Pass PSE information to serialize and write public information  */
            status = soscoreWriteBasicInfo(soscore);
            pPtr->model = _model;
            if (status != TK _OK) goto doneWriting;
/ * Create tagged items and pass to PSE to serialize and write    */
            status = writeForestBasicInfo((tkforestStatePtr) statePtr);
            if (status != TK _OK) goto doneWriting;
            status = writeForestOutputVars(statePtr);
            if (status != TK_OK) goto doneWriting;
            status = writeForestTargetVariables((tkforestStatePtr) statePtr);
            if (status != TK _OK) goto doneWriting;
            status = writeForestScoreIdVarsAndReorderInfo((tkforestStatePtr) statePtr);
            if (status != TK _OK) goto doneWriting;
            status = writeForestTreeInfo(statePtr);
            if (status != TK _OK) goto doneWriting;
            status = writeTheTargetIntoList((tkforestStatePtr) statePtr);
            if (status != TK_ OK) goto doneWriting;
            doneWriting:
/* write tag directory    */
            soscoreDone(soscore);
         }
         fail:
         destroyStateObject(statePtr, status);
         return status;
}
TKStatus writeBasicInfo(soscoreInstancePtr soscore)
{
   TKStatus status = TK_OK;
   status = writeRunInfo(soscore);
   if (status) goto fail;
   status = writeNLS(soscore);
   if (status) goto fail;
   status = writeTKModel(soscore);
   if (status) goto fail;
   status = writeXMLFormat(soscore);
   return status;
   fail:
      return status;
}
#define MAX_RUN_INFO_LEN 2048
static TKStatus writeRunInfo(soscoreInstancePtr soscore)
{
   itemDescriptor_S   item[1] = { 0 };
   soscorePrivatePtr   pPtr = (soscorePrivatePtr) soscore->privatePtr;
   enginePtr engine = pPtr->engine;
   TKStatus status = TK_OK;
   Char *data;
   if (engine == NULL) {
      status = ~TK_OK;
      goto fail;
   }
   item->tag = soscore_item_tag_runinfo;
   item->length = MAX_RUN_INFO_LEN;
   GET_TKMEM(pPtr->workPool, item->data, item->length, char, return TK_NOMEM);
   data = item->data,
   TK _ZB(data, ((TKMem Size) item->length));
```

```
            pPtr->sasDateTime = tkzdttme( );
            soscorePackDouble(pPtr->sasDateTime, data);
            status = packInt32AndTKChar(soscore, engine->mvaName, engine->mvaNameLen, &data);
            if (status) goto fail;
            status = packInt32AndTKChar(soscore, engine->name, engine->nameLen, &data);
            if (status) goto fail;
            status = packInt32AndTKChar(soscore, engine->entryPoint, engine->entryPointLen, &data);
            if (status) goto fail;
            soscorePackInt32(pPtr->gridHostNameLen, data);
            if (pPtr->gridHostNameLen > 0) {
                soscorePackTKChar(pPtr->gridHostName, pPtr->gridHostNameLen, data);
            }
            status = soscoreWriteItem(soscore, item);
            FREE_TKMEM(pPtr->workPool, item->data);
            return status;
        fail:
            FREE_TKMEM(pPtr->workPool, item->data);
            return ~TK_OK;
        }
        #define NUM_INT32S    10
        static TKStatus writeForestBasicInfo(tkforestStatePtr statePtr)
        {
            tkforestInstancePtr tkforest = statePtr->tkforest;
            tkforestPrivatePtr pPtr = GET_PRIVATEPTR(tkforest);
            tkforestScorePtr scorePtr = &pPtr->scorStr;
            soscoreInstancePtr soscore = statePtr->soscore;
            itemDescriptor_S item[1] = {0};
            int32_t itemp[NUM_INT32S] = {0};
            itemp[0] = scorePtr->nScorVars;
            itemp[1] = scorePtr->nIdvars;
            itemp[2] = pPtr->nModelVars;
            itemp[3] = pPtr->nTargetVars;
            itemp[4] = pPtr->ensRes.nTrees;
            item->data = itemp;
            item->length = NUM_INT32S * sizeof(int32_t);
            item->tag = tkforest_tag_basic_info;
            return soscoreWriteItem(soscore, item);
        }
        static TKStatus writeForestOutputVars(tkforestStatePtr statePtr)
        {
            soscoreInstancePtr soscore = statePtr->soscore;
            tkforestInstancePtr tkforest = statePtr->tkforest;
            tkforestPrivatePtr pPtr = (tkforestPrivatePtr) tkforest->instPrivate;
            tkVarBlobPtr blobPtr = NULL;
            TKStatus status = TK_OK;
            itemDescriptor_S item[1] = {0};
            item->tag = tkforest_tag_outvars;
            blobPtr = ztkvCreateBlobObject(pPtr->outList, NULL);
            if (blobPtr) {
                item->length = (blobPtr) ? blobPtr->size : 0;
                item->data = (blobPtr) ? blobPtr->blob : 0;
                status = soscoreWriteItem(soscore, item);
                (*blobPtr->Destroy) (&blobPtr);
            }else
                return ~TK_OK;
            return status;
        }
        static TK Status writeForestTargetVariables(tkforestStatePtr statePtr)
        {
            tkforestInstancePtr tkforest = statePtr->tkforest;
            tkforestPrivatePtr pPtr = GET_PRIVATEPTR(tkforest);
            tkforestVarPtr targetVars = pPtr->targetVars;
            int nTargetVars = pPtr->nTargetVars;
            soscoreInstancePtr soscore = statePtr->soscore;
            int i;
            TKStatus status = TK_OK;
            itemDescriptor_S item [1] = {0};
            char *data;
            if (nTargetVars <= 0) return status;
            item->length = 0;
            for (i = 0; i < nTargetVars; i++) {
                tkVarPtr tkv = targetVars[i].var;
                item->length += 2L * sizeof(int32_t) + tkv->nameLen * sizeof(TKChar);
            }
            GET_TKMEM(pPtr->pool, item->data, item->length, char, return TK_NOMEM);
            data = (char *) item->data;
            for (i = 0; i < nTargetVars; i++) {
                int type = 0;
                tkVarPtr      tkv = targetVars[i].var;
```

```
      if (tkv->specialFlag & TKFRST_ZTKVARL_FLAG_CENSOR) {
         type = TKFRST_VARROLE_CENSOR;
      }else if (tkv->specialFlag & TKFRST_ZTKVARL_FLAG_PROPENSITY) {
         type = TKFRST_VARROLE_PROPENSITY;
      }else if (tkv->specialFlag & TKFRST_ZTKVARL_FLAG_TIME) {
         type = TKFRST_VARROLE_TIME;
      }else if (tkv->specialFlag & TKFRST_ZTKVARL_FLAG_TREATMENT) {
         type = TKFRST_VARROLE_TREATMENT;
      }else {
         type = TKFRST_VARROLE_TARGET;
      }
      soscorePackInt32(tkv->nameLen, data);
      soscorePackInt32(type, data);
      soscorePackTKChar(tkv->name, tkv->nameLen, data),
   }
   item->tag = tkforest_tag_target_vars;
   status = soscoreWriteItem(soscore, item);
   FREE_ TKMEM(pPtr->pool, item->data);
   return status;
}
static TKStatus writeForestScoreIdVarsAndReorderInfo(tkforestStatePtr statePtr)
{
   TKStatus status = TK_OK,
   tkforestInstancePtr tkforest = statePtr->tkforest,
   tkforestPrivatePtr pPtr = (tkforestPrivatePtr) tkforest->instPrivate;
   tkforestScorePtr scorePtr = &pPtr->scorStr;
   soscoreInstancePtr soscore = statePtr->soscore;
   itemDescriptor_S item[1] = {   0   };
   char *data;
   if (scorePtr->nScorVars <= 0) return status;
   GET_TKMEM(pPtr->pool, item->data, 2L * scorePtr->nScorVars, int32_t, return
      TK_NOMEM);
   item->tag = tkforest_tag_score_vars_ids_and_reorder,
   item->length = 2L * scorePtr->nScorVars * sizeof(int32_t);
   data = item->data;
   soscorePackManyInt32s(scorePtr->reordLst, scorePtr->nScorVars, data);
   soscorePackManyInt32s(scorePtr->scorVarId, scorePtr->nScorVars, data);
   return soscoreWriteItem(soscore, item);
}
static TKStatus writeForestTreeInfo(tkforestStatePtr statePtr)
{
   soscoreInstancePtr soscore = statePtr->soscore;
   tkforestInstancePtr tkforest = statePtr->tkforest;
   tkforestPrivatePtr pPtr = GET_PRIVATEPTR(tkforest);
   int32_t nTrees = pPtr->ensRes.nTrees;
   TKMemPtr *blobs = pPtr->ensRes.treeMod;
   TKStatus status = TK_OK;
   itemDescriptor_S item [1] = {      0   };
   int32_t id;
   if (nTrees <= 0) return status;
   for (id = 0; id < nTrees; id++) {
      double *dPtr = (double *) blobs[id];
      int32_t blobL = *dPtr;
      item->tag = tkforest_tag_save_treeinfo_begin + id;
      item->length = blobL;
      item->data = (TKMemPtr) dPtr;
      status = soscoreWriteItem(soscore, item);
      if (status) return status,
   }
   return status;
}
static TKStatus writeTheTargetIntoList(tkforestStatePtr statePtr)
{
   tkforestInstancePtr tkforest = statePtr->tkforest,
   soscoreInstancePtr soscore = statePtr->soscore;
   tkforestPrivatePtr pPtr = (tkforestPrivatePtr) tkforest->instPrivate;
   tkModelPtr modelPtr = pPtr->model;
   tkVarListPtr vList = modelPtr->vList;
   tkVarPtr *targetList = vList->TargetList;
   tkVarPt target = targetList[0];
   tkdlvClasVarPtr cv = (tkdlvClasVarPtr) (target->dlvPtr);
   uint32_t eventLength = FMAX(cv->maxFormLen, target->formattedDataLen);
   int nLevels = cv->nlev;
   int missingLevel = -1;
   int i;
   char *source;
   char *data;
   itemDescriptor_S item[1] = { 0 };
   for (i = 0; i < cv->nlev; i++) {
```

```
      char *c = cv->LevToForm[i]->c;
      if (TK_AB('', c, eventLength)) {
         missingLevel = i;
         nLevels--;
         break;
      }
   }
}
item->length = sizeof(int32_t) + nLevels * 32;
GET_TKMEM(pPtr->pool, item->data, item->length, char, return TK_NOMEM);
item->tag = tkforest_tag_target_into_list;
data = item->data;
soscorePackInt32(nLevels, data);
for (i = 0; i < cv->nlev; i++) {
   if (i != missingLevel) {
      char     temp[32];
      tkdlvFormNodePtr fnode = cv->LevToForm[i];
      TK_BB(temp, 32);
      source = fnode->c;
      TK_MB(source, temp, eventLength);
      soscorePackChar(temp, 32, data);
   }
}
return soscoreWriteItem(soscore, item);
}
```

What is claimed is:

1. A non-transitory computer-readable medium having stored thereon computer-readable instructions that when executed by a computing device cause the computing device to:

receive a first indicator of a dataset;

receive a second indicator of an analytic model state file in which a state of an analytic model is stored;

read a tag directory from the analytic model state file, wherein the tag directory includes a unique tag for a state item, a state item offset value at which the state item is stored, and a state item length value that defines a length in bytes of the state item for each state item of a set of tagged items;

extract a reentry point name of a function to restore the analytic model from the state stored in the analytic model state file indicated by the received second indicator, wherein the reentry point name is extracted using a tag of the set of tagged items associated with storing the reentry point name;

call the function using the extracted reentry point name to restore the state of the analytic model;

score the dataset indicated by the received first indicator using the restored state of the analytic model; and write scoring results from the scored dataset to an output file.

2. The non-transitory computer-readable medium of claim 1, wherein the tag directory is read from the analytic model state file as a continuous block of bytes.

3. The non-transitory computer-readable medium of claim 2, wherein the continuous block of bytes are read in binary.

4. The non-transitory computer-readable medium of claim 1, wherein the state is restored by extracting each remaining state item of the set of tagged items from the state stored in the analytic model state file using the read tag directory.

5. The non-transitory computer-readable medium of claim 4, wherein a public serializing engine reads the tag directory from the analytic model state file.

6. The non-transitory computer-readable medium of claim 5, wherein the public serializing engine reads a first group of tagged items of the set of tagged items from the state stored in the analytic model state file.

7. The non-transitory computer-readable medium of claim 6, wherein the first group of tagged items are public state items used for each analytic model type of a plurality of analytic model types.

8. The non-transitory computer-readable medium of claim 6, wherein the first group of tagged items include byte identifiers that include byte sequences of a plurality of data types.

9. The non-transitory computer-readable medium of claim 6, wherein the first group of tagged items include an input variable list for the dataset.

10. The non-transitory computer-readable medium of claim 9, wherein the first group of tagged items include statistics for each input variable of the input variable list.

11. The non-transitory computer-readable medium of claim 6, wherein the first group of tagged items include an output variable list for the dataset.

12. The non-transitory computer-readable medium of claim 6, wherein the first group of tagged items include a name of an analytic model type of the analytic model.

13. The non-transitory computer-readable medium of claim 12, wherein the function reads a remaining group of tagged items of the set of tagged items from the state stored in the analytic model state file, wherein the remaining group of tagged items is determined based on the analytic model type.

14. The non-transitory computer-readable medium of claim 1, wherein a public serializing engine extracts the reentry point name and calls the function.

15. The non-transitory computer-readable medium of claim 1, wherein the called function instantiates an analytic engine for the analytic model, wherein the instantiated analytic engine scores the dataset.

16. The non-transitory computer-readable medium of claim 15, further comprising computer-readable instructions that, when executed by the computing device, cause the computing device to, before scoring the dataset:

extract an output variable list from the set of tagged items stored in the analytic model state file; and extract an input variable list for the dataset from the set of tagged items stored in the analytic model state file.

17. A computing device comprising:
a processor; and
a non-transitory computer-readable medium operably coupled to the processor, the computer-readable medium having computer-readable instructions stored thereon that, when executed by the processor, control the computing device to
receive a first indicator of a dataset;
receive a second indicator of an analytic model state file in which a state of an analytic model is stored;
read a tag directory from the analytic model state file, wherein the tag directory includes a unique tag for a state item, a state item offset value at which the state item is stored, and a state item length value that defines a length in bytes of the state item for each state item of a set of tagged items;
extract a reentry point name of a function to restore the analytic model from the state stored in the analytic model state file indicated by the received second indicator, wherein the reentry point name is extracted using a tag of the set of tagged items associated with storing the reentry point name
call the function using the extracted reentry point name to restore the state of the analytic model;
score the dataset indicated by the received first indicator using the restored state of the analytic model; and
write scoring results from the scored dataset to an output file.

18. The computing device of claim 17, wherein the tag directory is read from the analytic model state file as a continuous block of binary bytes.

19. The computing device of claim 17, wherein the state is restored by extracting each remaining state item of the set of tagged items from the state stored in the analytic model state file using the read tag directory.

20. The computing device of claim 17, wherein a public serializing engine extracts the reentry point name and calls the function, wherein the called function instantiates an analytic engine for the analytic model, wherein the instantiated analytic engine scores the dataset.

21. A method of restoring a state of an analytic model, the method comprising:
receiving a first indicator of a dataset;
receiving a second indicator of an analytic model state file in which a state of an analytic model is stored;
reading, by a computing device, a tag directory from the analytic model state file, wherein the tag directory includes a unique tag for a state item, a state item offset value at which the state item is stored, and a state item length value that defines a length in bytes of the state item for each state item of a set of tagged items;
extracting, by the computing device, a reentry point name of a function to restore the analytic model from the state stored in the analytic model state file indicated by the received second indicator, wherein the reentry point name is extracted using a tag of the set of tagged items associated with storing the reentry point name;
calling, by the computing device, the function using the extracted reentry point name to restore the state of the analytic model;
scoring, by the computing device, the dataset indicated by the received first indicator using the restored state of the analytic model; and
writing, by the computing device, scoring results from the scored dataset to an output file.

22. The method of claim 21, wherein the tag directory is read from the analytic model state file as a continuous block of binary bytes.

23. The method of claim 21, wherein the state is restored by extracting each remaining state item of the set of tagged items from the state stored in the analytic model state file using the read tag directory.

24. The method of claim 21, wherein a public serializing engine extracts the reentry point name and calls the function, wherein the called function instantiates an analytic engine for the analytic model, wherein the instantiated analytic engine scores the dataset.

25. A non-transitory computer-readable medium having stored thereon computer-readable instructions that when executed by a computing device cause the computing device to:
receive a first indicator of a dataset;
receive a second indicator of an analytic model state file in which a state of an analytic model is stored;
extract a reentry point name of a function to restore the analytic model from the state stored in the analytic model state file indicated by the received second indicator;
call the function using the extracted reentry point name to restore the state of the analytic model, wherein the called function instantiates an analytic engine for the analytic model;
extract an output variable list from the state stored in the analytic model state file;
extract an input variable list for the dataset from the state stored in the analytic model state file;
score the dataset indicated by the received first indicator using the restored state of the analytic model and the instantiated analytic engine, wherein scoring the dataset comprises:
preparing input data buffers for each input variable included in the extracted input variable list; and
notifying the instantiated analytic engine of a location of output variables of the extracted output variable list; and
write scoring results from the scored dataset to an output file.

26. The non-transitory computer-readable medium of claim 25, wherein scoring the dataset further comprises:
receiving, by the instantiated analytic engine, notification of the location of the output variables;
creating, by the instantiated analytic engine, variables to produce a score using the prepared input data buffers; and
filling, by the instantiated analytic engine, the output variables based on the received notification of the location of the output variables after producing the score.

27. The non-transitory computer-readable medium of claim 26, wherein scoring the dataset further comprises writing an output buffer of the filled output variables.

28. The non-transitory computer-readable medium of claim 25, wherein a public serializing engine extracts the reentry point name and calls the function.

29. The non-transitory computer-readable medium of claim 25, wherein the state is read from the analytic model state file as a continuous block of binary bytes.

30. A computing device comprising:
a processor; and
a non-transitory computer-readable medium operably coupled to the processor, the computer-readable medium having computer-readable instructions stored thereon that, when executed by the processor, control the computing device to receive a first indicator of a dataset;
receive a second indicator of an analytic model state file in which a state of an analytic model is stored;
extract a reentry point name of a function to restore the analytic model from the state stored in the analytic model state file indicated by the received second indicator;
call the function using the extracted reentry point name to restore the state of the analytic model, wherein the called function instantiates an analytic engine for the analytic model;
extract an output variable list from the state stored in the analytic model state file;
extract an input variable list for the dataset from the state stored in the analytic model state file;
score the dataset indicated by the received first indicator using the restored state of the analytic model and the instantiated analytic engine, wherein scoring the dataset comprises:
  preparing input data buffers for each input variable included in the extracted input variable list; and
  notifying the instantiated analytic engine of a location of output variables of the extracted output variable list; and
write scoring results from the scored dataset to an output file.

31. The computing device of claim 30, wherein scoring the dataset further comprises:
receiving, by the instantiated analytic engine, notification of the location of the output variables;
creating, by the instantiated analytic engine, variables to produce a score using the prepared input data buffers; and
filling, by the instantiated analytic engine, the output variables based on the received notification of the location of the output variables after producing the score.

32. The computing device of claim 31, wherein scoring the dataset further comprises writing an output buffer of the filled output variables.

33. The computing device of claim 30, wherein a public serializing engine extracts the reentry point name and calls the function.

34. The computing device of claim 30, wherein the state is read from the analytic model state file as a continuous block of binary bytes.

35. A method of restoring a state of an analytic model, the method comprising:
receiving a first indicator of a dataset;
receiving a second indicator of an analytic model state file in which a state of an analytic model is stored;
extracting, by a computing device, a reentry point name of a function to restore the analytic model from the state stored in the analytic model state file indicated by the received second indicator;
calling, by the computing device, the function using the extracted reentry point name to restore the state of the analytic model, wherein the called function instantiates an analytic engine for the analytic model;
extracting, by the computing device, an output variable list from the state stored in the analytic model state file;
extracting, by the computing device, an input variable list for the dataset from the state stored in the analytic model state file;
scoring, by the computing device, the dataset indicated by the received first indicator using the restored state of the analytic model and the instantiated analytic engine, wherein scoring the dataset comprises:
  preparing input data buffers for each input variable included in the extracted input variable list; and
  notifying the instantiated analytic engine of a location of output variables of the extracted output variable list; and
writing, by the computing device, scoring results from the scored dataset to an output file.

36. The method of claim 35, wherein scoring the dataset further comprises:
receiving, by the instantiated analytic engine, notification of the location of the output variables;
creating, by the instantiated analytic engine, variables to produce a score using the prepared input data buffers; and
filling, by the instantiated analytic engine, the output variables based on the received notification of the location of the output variables after producing the score.

37. The method of claim 36, wherein scoring the dataset further comprises writing an output buffer of the filled output variables.

38. The method of claim 35, wherein a public serializing engine extracts the reentry point name and calls the function.

39. The method of claim 35, wherein the state is read from the analytic model state file as a continuous block of binary bytes.

* * * * *